(12) United States Patent
Sellam

(10) Patent No.: US 11,232,724 B2
(45) Date of Patent: Jan. 25, 2022

(54) INDIVIDUALLY CONTROLLABLE LIGHT EMITTING DIODE MODULES FOR DISPLAYING DEFINED PATTERNS

(71) Applicant: MEDIA GRAPH DEPOT INC., Montreal (CA)

(72) Inventor: David Sellam, Montreal (CA)

(73) Assignee: MEDIA GRAPH DEPOT INC., Montreal (CA)

( * ) Notice: Subject to any disclaimer, the term of this patent is extended or adjusted under 35 U.S.C. 154(b) by 312 days.

(21) Appl. No.: 16/490,324

(22) PCT Filed: Apr. 11, 2017

(86) PCT No.: PCT/CA2017/050441
§ 371 (c)(1),
(2) Date: Aug. 30, 2019

(87) PCT Pub. No.: WO2018/157229
PCT Pub. Date: Sep. 7, 2018

(65) Prior Publication Data
US 2021/0327314 A1     Oct. 21, 2021

Related U.S. Application Data

(60) Provisional application No. 62/465,936, filed on Mar. 2, 2017.

(51) Int. Cl.
*F21S 4/00*         (2016.01)
*G09F 13/04*       (2006.01)
(Continued)

(52) U.S. Cl.
CPC .................. *G09F 9/33* (2013.01); *F21K 9/20* (2016.08); *F21V 19/003* (2013.01);
(Continued)

(58) Field of Classification Search
CPC . G09F 9/33; G09F 9/375; H05B 45/00; F21V 23/002; F21V 19/003; F21K 9/20; G09G 3/32; F21S 4/20
See application file for complete search history.

(56) References Cited

U.S. PATENT DOCUMENTS 9,797,559 B2 * 10/2017 Sellam .................. F21V 19/003
11,107,151 B2 * 8/2021 Scalzi ................... G09F 9/3026
(Continued)

FOREIGN PATENT DOCUMENTS

CN      104375791 A     2/2015
CN      104903644 A     9/2015
(Continued)

OTHER PUBLICATIONS

Extended European Search Report dated Oct. 30, 2020 for the corresponding European patent application No. 17898722.8.
(Continued)

*Primary Examiner* — Tracie Y Green
(74) *Attorney, Agent, or Firm* — Leason Ellis LLP

(57) ABSTRACT

A plurality of individually controllable LED modules (LEDs) are provided for displaying defined patterns. At least a first and second cables are provided with three or more conductive wires insulated from one another comprising at least one reference voltage wire, a positive voltage wire and a data wire. Each of a plurality of strips is maintained between the cables along a defined longitudinal distribution and receives the reference voltage, the positive voltage and the data therefrom. Each of the strips comprises a subset of the individually controllable LEDs positioned therealong in a defined transverse distribution. The display controller module comprises a processor that sends lighting instructions for the LEDs over the data wire. The lighting instructions are set considering the defined longitudinal distribution of the plurality of strips and the defined transverse distribu-
(Continued)

tion along each of the plurality of strips to provide the defined patterns.

25 Claims, 32 Drawing Sheets

(51) Int. Cl.
| | | |
|---|---|---|
| G09F 9/33 | (2006.01) | |
| G09G 3/32 | (2016.01) | |
| G09F 9/37 | (2006.01) | |
| F21K 9/20 | (2016.01) | |
| F21V 19/00 | (2006.01) | |
| F21V 23/00 | (2015.01) | |
| H05B 45/00 | (2020.01) | |

(52) U.S. Cl.
CPC ............ *F21V 23/002* (2013.01); *G09F 9/375* (2013.01); *G09G 3/32* (2013.01); *H05B 45/00* (2020.01)

(56) References Cited

U.S. PATENT DOCUMENTS

| 11,108,264 | B2* | 8/2021 | Chen .................... G01R 31/374 |
|---|---|---|---|
| 2010/0188321 | A1 | 7/2010 | Yen |
| 2011/0298692 | A1 | 12/2011 | De Loore et al. |
| 2014/0225808 | A1 | 8/2014 | Kline et al. |
| 2015/0049426 | A1 | 2/2015 | Smith et al. |
| 2015/0049483 | A1 | 2/2015 | Lee |
| 2015/0226391 | A1 | 8/2015 | Sellam |
| 2020/0360547 | A1* | 11/2020 | Smith .................... A61N 5/0624 |
| 2021/0020612 | A1* | 1/2021 | Yoo ...................... H01L 25/0753 |
| 2021/0199255 | A1* | 7/2021 | MacPherson ............. F21K 9/60 |
| 2021/0218280 | A1* | 7/2021 | Ogishima ............... H02J 50/12 |

FOREIGN PATENT DOCUMENTS

| JP | 2016-534449 A | 5/2007 |
|---|---|---|
| JP | 2008-052237 A | 3/2008 |
| JP | 2008-511041 A | 4/2008 |
| JP | 2012-079539 A | 4/2012 |
| JP | 2012-508402 A | 4/2012 |
| JP | 2015-537342 A | 12/2015 |
| JP | 2017-201387 A | 11/2017 |
| KR | 100954184 B1 | 4/2010 |
| WO | WO2007/049362 | 5/2007 |
| WO | 2010111874 A1 | 10/2010 |
| WO | 2014067010 A1 | 5/2014 |
| WO | 2014121716 A1 | 8/2014 |

OTHER PUBLICATIONS

International Search Report and Written Opinion dated Nov. 30, 2017 in International Patent Application No. PCT/CA2017/050441 filed Apr. 11, 2017. 11 pages.

* cited by examiner

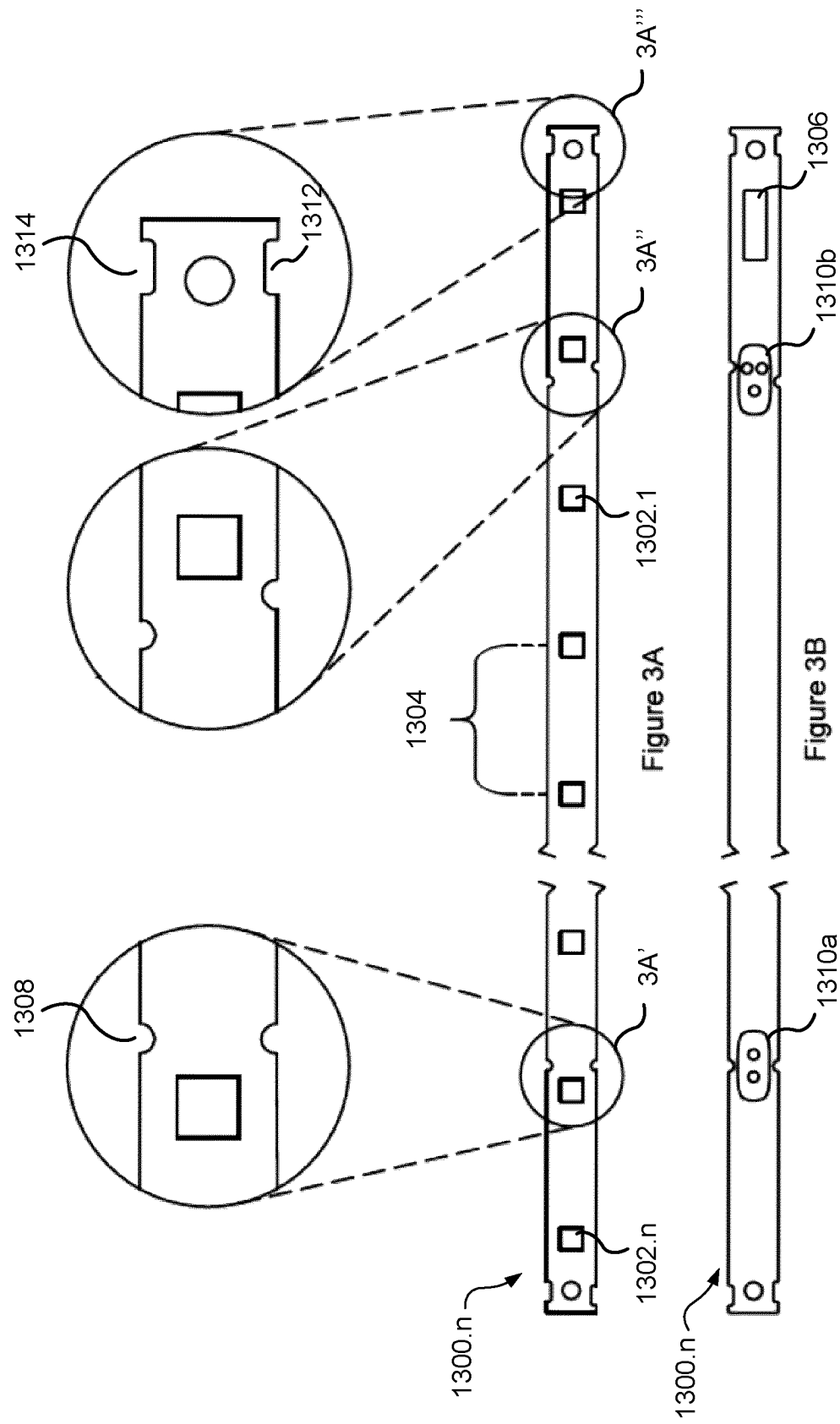

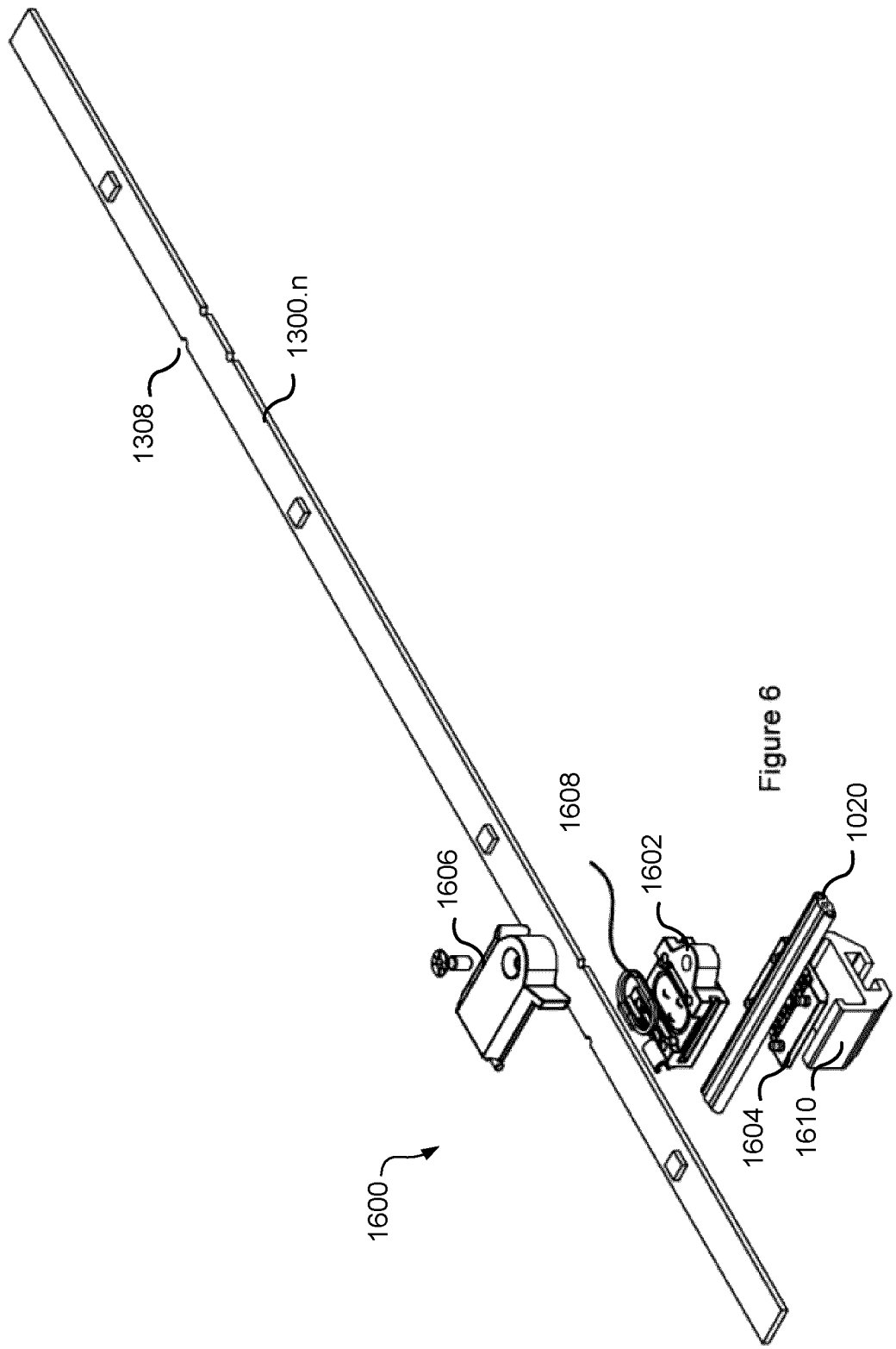

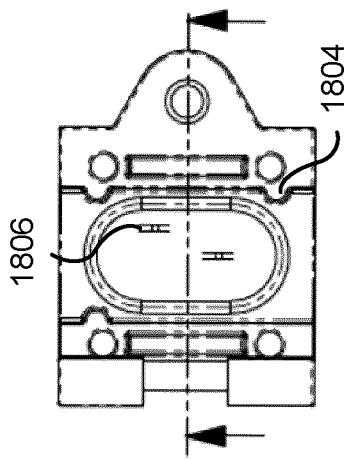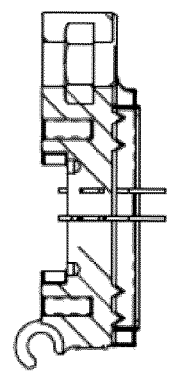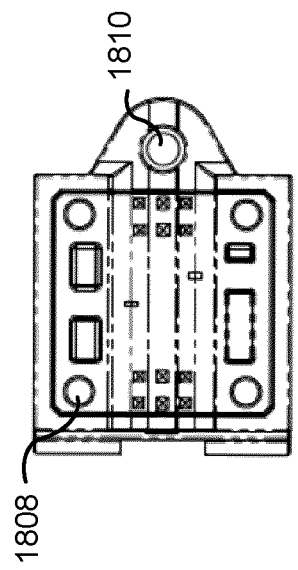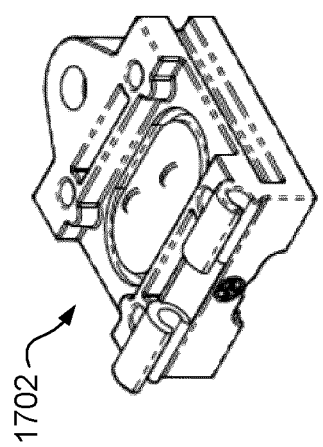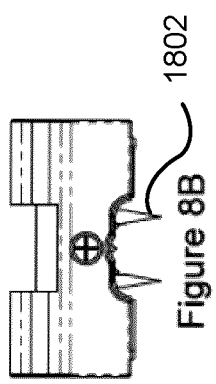

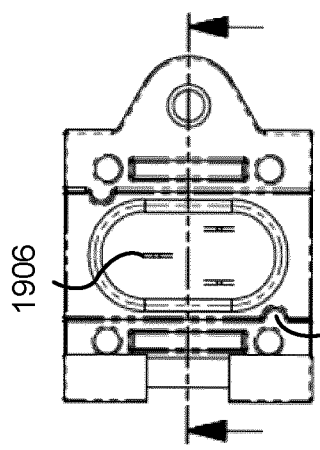
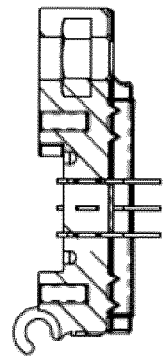
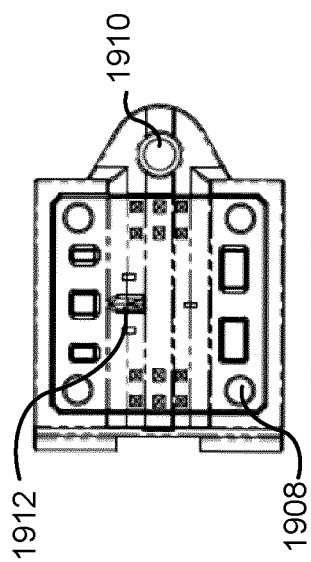
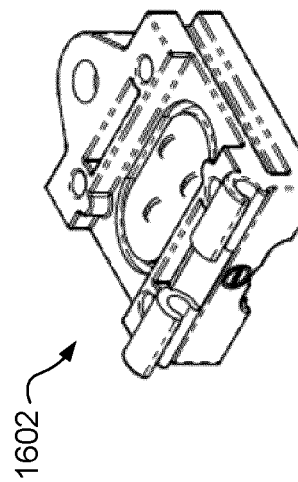
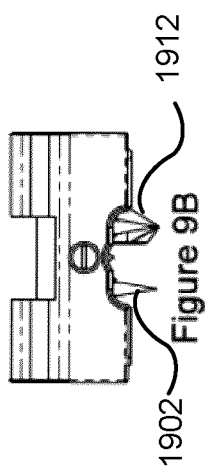

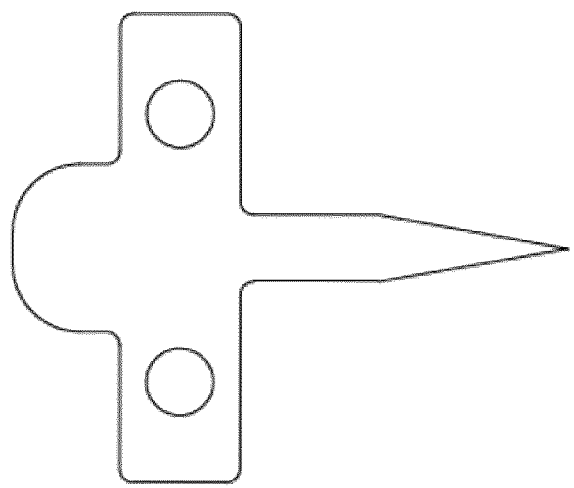
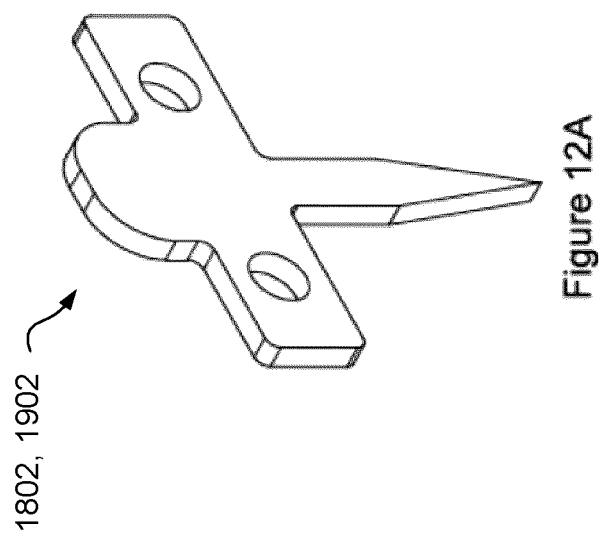

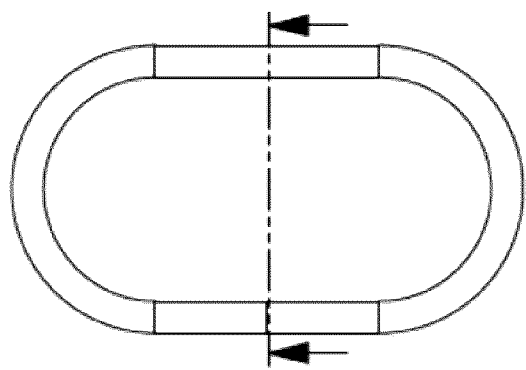
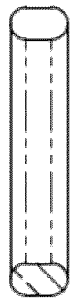
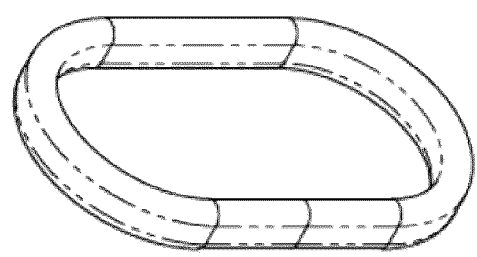

15000

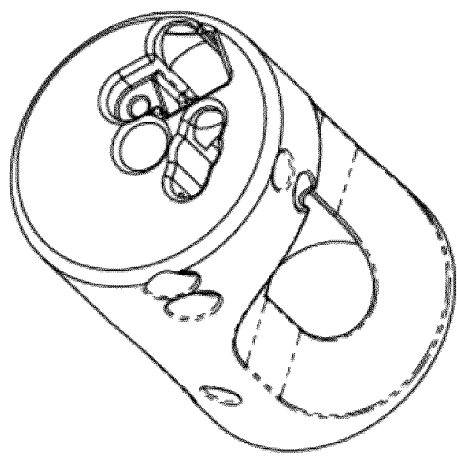
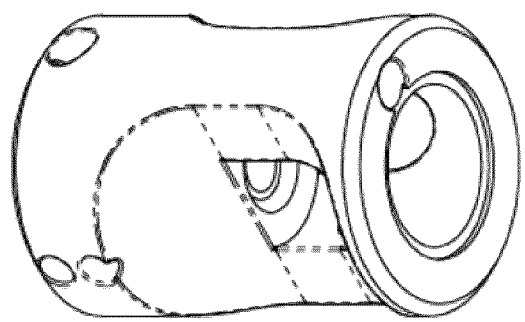

15000

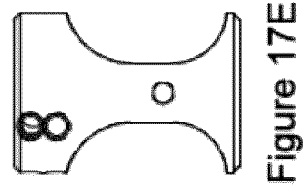
Figure 17E
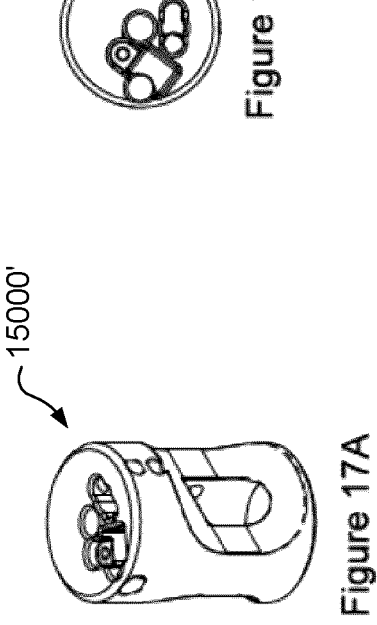
Figure 17B
Figure 17D
Figure 17A
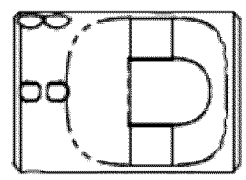
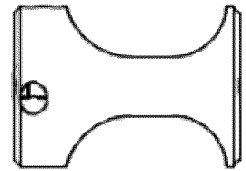
Figure 17C

18006'

18000'

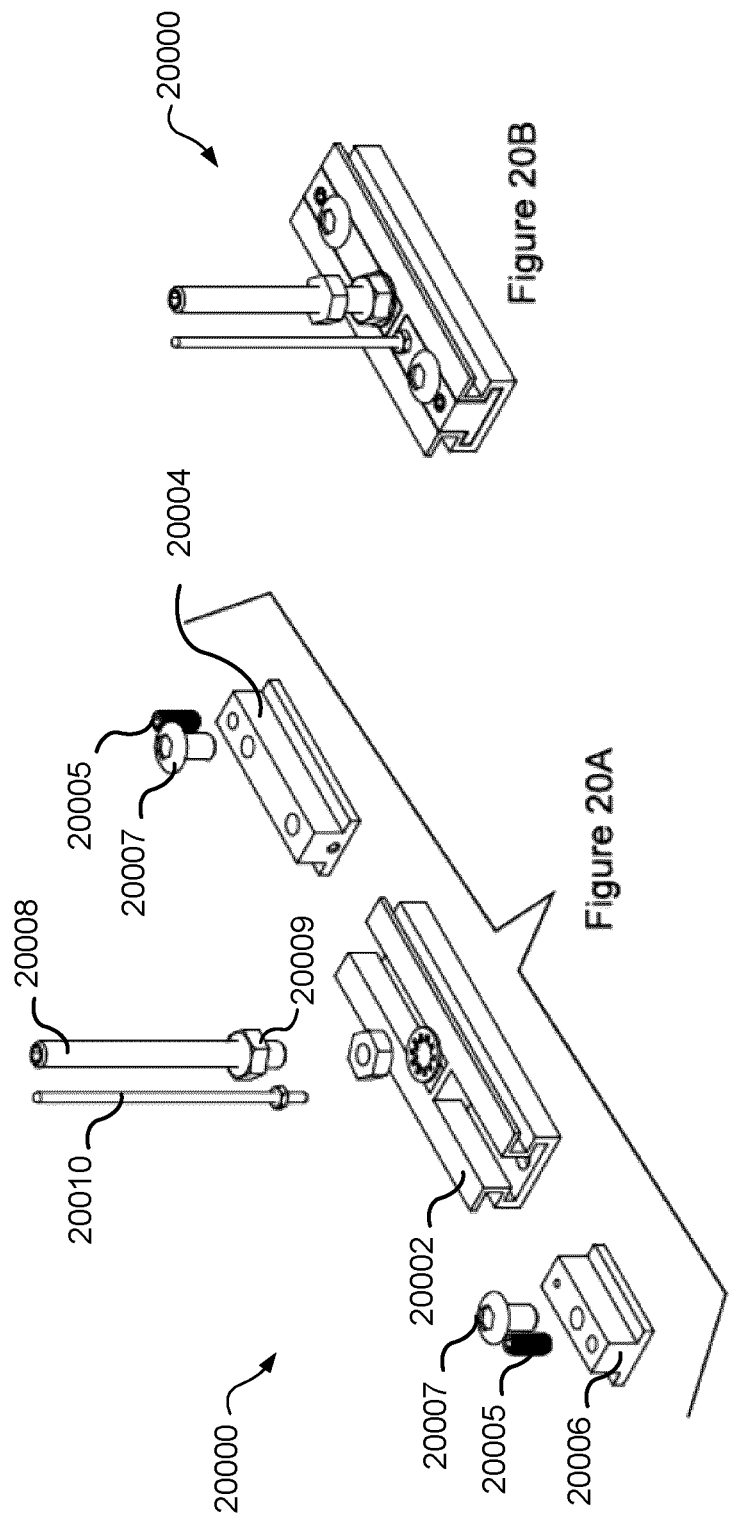

20002

20004

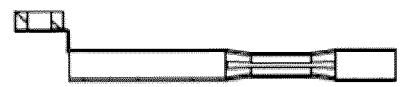
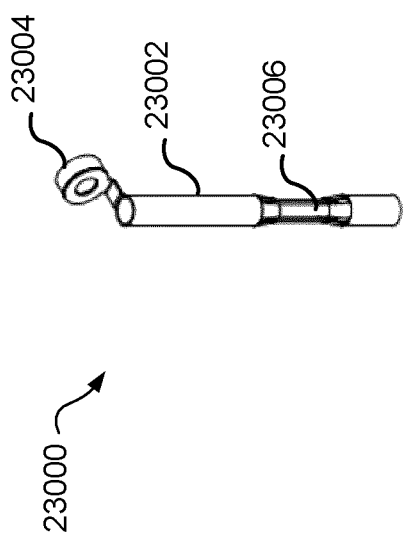

INDIVIDUALLY CONTROLLABLE LIGHT EMITTING DIODE MODULES FOR DISPLAYING DEFINED PATTERNS

PRIORITY STATEMENT

This application is a U.S. National Phase Application under 35 U.S.C. § 371 of International Patent Application No. PCT/CA2017/050441, filed Apr. 11, 2017, which claims the priority of U.S. Provisional Patent Application No. 62/465,936, filed Mar. 2, 2017, each of which is incorporated by reference as if expressly set forth in their respective entirety herein.

TECHNICAL FIELD

The present invention relates to display systems and, more specifically, to display systems comprising light emitting diode (LED) strips.

BACKGROUND

Conventional medium and large sized display systems are typically provided using one or more display screens (e.g., sport bars) or may also be custom made for a specific location or use case (e.g., Time Square in New York City). Display systems may be used to broadcast video streams (e.g., conventional live or recorded television, on-demand video streaming, interactive communication, successive still photographs or slideshow, etc.). Display systems may also be used for information broadcast (e.g., "zipper" news ticker) as well as ambiance lighting (e.g., relaxation rooms, dance floors, etc.).

It has been noticed that the versatility and adaptability of the current display systems is limited. The present invention at least partially addresses this shortcoming.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present invention is directed to a display system comprising a plurality of individually controllable light emitting diode modules (LEDs) for displaying defined patterns, a set of cables, a plurality of strips and a display controller module. Examples of defined patterns include still images, videos or other animated sequence of images, varying lighting patterns (e.g., changing colors and/or changing luminosity), etc. The set of cables, comprises at least a first cable and a second cable, providing three or more conductive wires insulated from one another comprising at least one reference voltage wire, a positive voltage wire and a data wire. Each of the plurality of strips is maintained between the first cable and the second cable along a defined longitudinal distribution and receives the reference voltage, the positive voltage and the data therefrom. Each of the plurality of strips comprises a subset of the individually controllable LEDs positioned therealong in a defined transverse distribution. The display controller module comprises at least one processor that sends lighting instructions for the plurality of individually controllable LEDs over the data wire. The lighting instructions are set considering the defined longitudinal distribution of the plurality of strips and the defined transverse distribution along each of the plurality of strips in order to provide the defined patterns.

The display system may optionally further comprise an enclosure with first cable extending between a first pair of installation locations along the enclosure and the second cable extending between a second pair of installation locations along the enclosure.

Each of the plurality of strips may also comprise a local processor for processing a subset of the lighting instructions related to the corresponding subset of individually controllable LEDs.

The display system may also further comprise a cable tensioner system coupled to the first cable and the second cable for adjusting tension in the first cable and tension in the second cable while insuring continued insulation of the at least three conductive wires.

In some embodiments, the set of cables comprises two reference voltages wires with the first cable comprising a first of the two reference voltage wires and the positive voltage wire and the second cable comprising a second of the two reference voltage wires and the data wire.

Optionally, each of the plurality of strips may be a Printed Circuit Board (PCB) and the display system may then further comprise a plurality of first connectors, permanently maintained on the first cable in accordance with the defined longitudinal distribution, detachably attaching one of the PCBs for providing the reference voltage and the positive voltage from the first cable thereto and a plurality of second connectors, permanently maintained on the second cable in accordance with the defined longitudinal distribution, detachably attaching the one of the PCBs for providing the data and the reference voltage from the second cable thereto. As an additional option, every one of the first connectors may be specifically shaped for a corresponding first structure of the PCB and every one of the second connectors may be specifically shaped for a corresponding second structure of the PCB different from the first structure for ensuring expected connectivity between the PCB and the set of cables. In some instances, the data wire may be cut in every one of the second connectors such that the lighting instructions transit through the PCB, causing the plurality of strips to be logically daisy-chained.

Optionally, the set of cables may comprise at least a third cable and a fourth cable parallel to the first cable and the second cable providing at least three additional conductive wires insulated from one another comprising a second reference voltage wire, a second positive voltage wire and a second data wire. In such an embodiment, the display system may further comprise a second plurality of strips maintained between the third and the fourth cable along a second defined longitudinal distribution matching the defined longitudinal distribution and receiving the reference voltage from the second reference voltage wire, the positive voltage from the second positive voltage wire and the data from the second data wire. Each of the second plurality of strips comprises an additional subset of the individually controllable LEDs positioned therealong in a second defined transverse distribution matching the defined transverse distribution. In some embodiments, In order to improve longitudinal alignment between the first plurality of strips and the second plurality of strips, one of the first cable or the second cable may be positioned between the third cable and the fourth cable. At least some of the second plurality of strips may mechanically attach to the one cable laid between the third cable and the fourth cable and at least some of the plurality of strips mechanically attach to one of the third cable and the fourth positioned between the first cable and the second cable (e.g., in an intertwined configuration). The display system may alternatively or in addition further comprise a transverse alignment mechanism for longitudinally aligning one or more lateral ends from individual ones of the plurality of strips to corresponding opposite ends from corresponding ones of the second plurality of strips. For instance, the transverse alignment mechanism may comprise oppositely polarized magnets on the one or more lateral ends and the corresponding opposite ends. The polarized magnets may be enclosed in respective mating enclosures respectively attached to the one or more lateral ends and the corresponding opposite ends.

In some embodiments, the defined longitudinal distribution establishes a longitudinal pitch of 10 mm to 200 mm between longitudinally aligned LEDs from different ones of the plurality of strips. The longitudinal pitch is usually constant throughout the defined longitudinal distribution, but it may also be variable. In some embodiments, the defined transverse distribution establishes a transverse pitch of 10 mm to 200 mm between LEDs in the subset of LEDs. The transverse pitch is usually constant throughout the defined transverse distribution, but it may also be variable. The longitudinal pitch and vertical pitch may be equal or different.

In some embodiments, each of the plurality of individually controllable LEDs is a surface-mount device light-emitting diode module comprising one to four individual light-emitting diodes.

A second aspect of the present invention is directed to a method for displaying defined patterns on a temporary or permanent display system comprising a plurality of individually controllable light emitting diode modules (LEDs). Examples of defined patterns include still images, videos or other animated sequence of images, varying lighting patterns (e.g., changing colors and/or changing luminosity), etc. The method comprises installing a set of cables, comprising at least a first cable and a second cable, providing three or more three conductive wires insulated from one another comprising at least one reference voltage wire, a positive voltage wire and a data wire. The method also comprises detachably attaching a plurality of strips between the first cable and the second cable along a defined longitudinal distribution, the reference voltage, the positive voltage and the data being received therefrom by the plurality of strips, each of the plurality of strips comprising a subset of the individually controllable LEDs positioned therealong in a defined transverse distribution. The method also comprises sending lighting instructions for the plurality of individually controllable LEDs over the data wire, the lighting instructions being set considering the defined longitudinal distribution of the plurality of strips and the defined transverse distribution along each of the plurality of strips in order to provide the defined patterns.

Optionally, the method may further comprise, prior to sending lighting instructions, sending configuration instructions to the plurality of strips over the data wire for assigning a unique identifier to each of the plurality of individually controllable LEDs.

Optionally, the method may also, alternatively or in addition, further comprise, prior to sending lighting instructions, mapping each of the plurality of individually controllable LEDs to defined coordinates in the display system considering the defined transverse distribution and the defined longitudinal distribution. In such an embodiment, the method may also further comprise, prior to sending lighting instructions, encoding a video stream into the lighting instructions considering the defined coordinates.

A third aspect of the present invention is directed a method of fabricating a cable for use in a temporary or permanent display system. The display system comprises a plurality of individually controllable light emitting diode modules (LEDs) positioned on a plurality of strips. The method comprises providing a cable, comprising two or more conductive wires insulated from one another, under controlled tension in an assembly machine. The method follows by, in the assembly machine, providing a first strip receiver component and a second strip receiver component each comprising at least two through-contact brackets isolated from one another each comprising a piercing end through a first surface of the strip receiver component and a PCB-compatible electrical contact point through a second surface opposite from the first surface of the strip receiver. While the cable is under controlled tension in the assembly machine, the method continues with fixably positioning the first strip receiver component of a first connector at a first location on the cable, wherein the through-contact brackets of the first strip receiver provide electric connection towards corresponding ones of the two or more conductive wires. Still in the assembly machine, after advancing the cable under controlled tension by a specific distance, the method comprises fixably positioning the second strip receiver component of a second connector at a second location on the cable, wherein the through-contact brackets of the second strip receiver provide electric connection towards corresponding ones of the two or more conductive wires, the specific distance defining longitudinal distribution of the LEDs for the display system. The method also comprises positioning a first strip holder over the first strip receiver of the first connector and a second strip holder over the second strip receiver of the second connector, wherein the first strip holder and the first strip receiver cooperate for ensuring continued electrical connection of the PCB-compatible electrical contact point of the first strip receiver with a first one of the plurality of strips and the second strip holder and the second strip receiver cooperate for ensuring continued electrical connection of the PCB-compatible electrical contact point of the second strip receiver with a second one of the plurality of strips.

In some embodiments, the first strip receiver component and the second strip receiver component are of a first model compatible with a first positioning structure of the strips and the method further comprises providing a second cable, comprising two or more conductive wires insulated from one another, under the controlled tension in the assembly machine. The method then comprises, in the assembly machine, providing a third strip receiver component and a fourth strip receiver component each of a second model compatible with a second positioning structure of the strips. Still in the assembly machine and while the second cable is under controlled tension, the method continues with fixably positioning the third strip receiver component of a third connector at a first location on the second cable, wherein the through-contact brackets of the third strip receiver provide electric connection towards corresponding ones of the two or more conductive wires. After advancing the second cable under controlled tension by the specific distance in the assembly machine, the method comprises fixably positioning the fourth strip receiver component of a fourth connector at a second location on the second cable before positioning a third strip holder over the third strip receiver of the third connector and a fourth strip holder over the fourth strip receiver of the fourth connector, wherein the third strip holder and the third strip receiver cooperate for ensuring continued electrical connection of the PCB-compatible electrical contact point of the third strip receiver with the first one of the plurality of strips and the fourth strip holder and the fourth strip receiver cooperate for ensuring continued electrical connection of the PCB-compatible electrical contact point of the fourth strip receiver with the second one of the plurality of strips. The two or more conductive wires of the cable and the two or more conductive wires of the second cable provide, in the display system, a reference voltage, a positive voltage and a data feed.

BRIEF DESCRIPTION OF THE DRAWINGS

Further features and exemplary advantages of the present invention will become apparent from the following detailed description, taken in conjunction with the appended drawings, in which:

FIG. 3A and FIG. 3B, herein referred to concurrently as FIG. 3, are respective a front and back views of an exemplary strip in accordance with the teachings of the present invention;

FIG. 6 is an exploded perspective view of an exemplary first connector assembly in accordance with the teachings of the present invention;

FIG. 8A, FIG. 8B, FIG. 8C, FIG. 8D and FIG. 8E, herein referred to concurrently as FIG. 8, are views of an exemplary second strip receiver in accordance with the teachings of the present invention;

FIG. 9A, FIG. 9B, FIG. 9C, FIG. 9D and FIG. 9E, herein referred to concurrently as FIG. 9, are views of an exemplary first strip receiver in accordance with the teachings of the present invention;

FIG. 12A, FIG. 12B and FIG. 12C, herein referred to concurrently as FIG. 12, are views of an exemplary piercing PCB-contact point in accordance with the teachings of the present invention;

FIG. 13A, FIG. 13B and FIG. 13C, herein referred to concurrently as FIG. 13, are views of an exemplary PCB-side seal in accordance with the teachings of the present invention;

FIG. 16A, FIG. 16B, FIG. 16C, FIG. 16D, FIG. 16D, FIG. 16E, FIG. 16F, FIG. 16G, FIG. 16H and FIG. 16I, herein referred to concurrently as FIG. 16, are views of an exemplary cable tensioner body in accordance with the teachings of the present invention;

FIG. 17A, FIG. 17B, FIG. 17C, FIG. 17D and FIG. 17E, herein referred to concurrently as FIG. 17, are views of an exemplary mirrored cable tensioner body in accordance with the teachings of the present invention;

FIG. 20A and FIG. 20B, herein referred to concurrently as FIG. 20, are perspective views of an exemplary frame connector assembly in accordance with the teachings of the present invention;

FIG. 23A, FIG. 23B and FIG. 23C, herein referred to concurrently as FIG. 23, are views of an exemplary slug connector in accordance with the teachings of the present invention;

DETAILED DESCRIPTION

Figure 1:
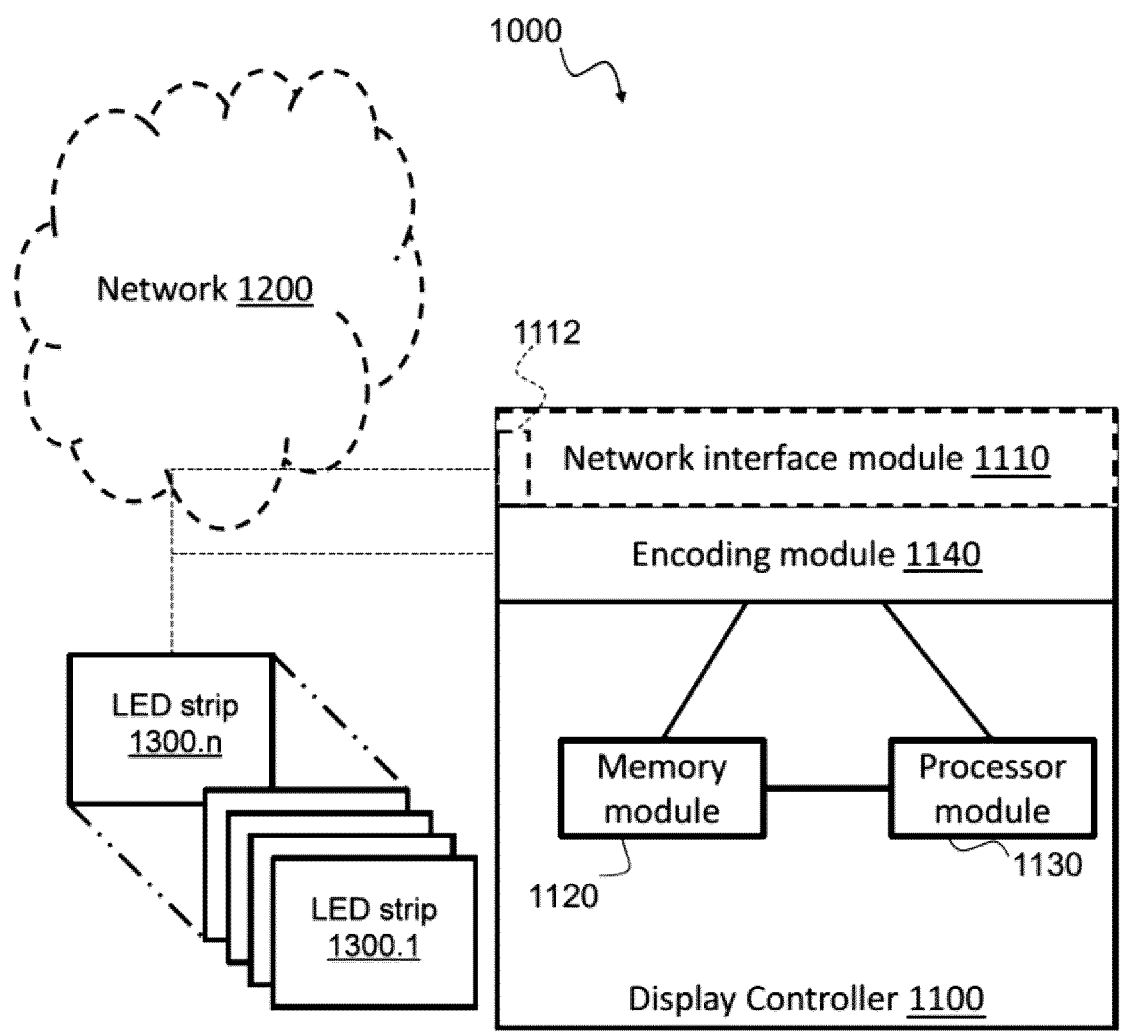
FIG. 1 is a logical modular view of an exemplary display system in accordance with the teachings of the present invention.

A display system is provided for displaying defined lighting patterns. Examples of defined patterns include still images, videos or other animated sequence of images, varying lighting patterns (e.g., changing colors and/or changing luminosity), etc. While skilled person will readily understand how to adapt the teachings of the present disclosure to a wide range of applications, the display system has been developed to support display of large-scale defined patterns with no width limitations and a height dimension of up to 40-50 meters. Of course, the teachings of the present disclosure may be used in display systems of greater or smaller dimensions.

As will become apparent from the following description, a display system is provided comprising a first cable and a second cable. The first and second cables may be extending between two regular or irregular surfaces. In some embodiments, the surfaces are part of a frame of the display system (e.g., the first and second cables extend between opposite members within the frame), but the surfaces may also be provided by any combination of wall, ceiling and/or floor (different portions of a wall providing different surfaces or between a wall and the floor or between the ceiling and the floor, etc.) Likewise, the first and second cables do not necessarily need to extend from the same surfaces. In embodiments of the present invention, a plurality of LED strips are maintained between the first and second cables along a longitudinal distribution (i.e., along a longitudinal axis in the display system defined by the first and second cables). The longitudinal distribution can therefore define a "vertical" pitch in the display system. Each LED strip comprises a plurality of LED modules secured thereon (e.g., by soldering or other appropriate means) along a transverse distribution (i.e., along a longitudinal axis of the LED strip, which defines a transverse axis when compared to the longitudinal axis previously defined in the display system). The transverse distribution can therefore define a "horizontal" pitch in the display system. Of course, the notion of longitudinal vs. transverse and/or vertical vs. horizontal are to be understood relative to one another and not literally.

The first and second cables provide at least a positive voltage wire, a reference voltage wire, and a data wire, each of which are insulated from one another. The insulation may also be provided towards exterior elements (e.g., weather-resistant and/or weather-proof). These wires are connected to each of the plurality of LED strips (e.g., using a cable connector assembly that couples the first and second cables to opposite ends of the LED strips). The positive voltage wire and the reference voltage wire provide power to each of the LED strip. The data wire conveys lighting instructions to the LED strips, allowing individual control of the LED modules on each the LED strip (e.g., received at a local processor located thereon on a face opposite from the LED modules). The lighting instructions may be received from a remote processor or display controller. Prior to receiving lighting instructions, configuration instructions may be received from the remote processor or display controller to the plurality of LED strips to uniquely identify and map each of the plurality of LED modules on the respective plurality of LED strips considering the longitudinal distribution and vertical distribution.

In certain embodiments, the display system comprises multiple "sub-panels", each formed by two cables (typically parallel), positioned in next to one another (typically in parallel) for a wider display area. Each of the sub-panels may be provided with a dedicated controller (e.g., synchronized with one another) or a single controller may be used for multiple sub-panels. Likewise, more than one controller may be used in a single sub-panel. To longitudinally align LED strips from different parallel sub-panels, one or more alignment mechanisms may be used (e.g., magnet enclosures and mechanical connections). When the display system is provided within the frame, the cables may further be adjustably tensioned, e.g., using a cable tensioner assembly, and the frame may be provided in conductive material used to convey the reference voltage to the display system (e.g., using a tensioner and connector assembly).

Methods for displaying defined patterns on the display system, as well as for fabricating a cable for use in the display system, are also provided. As mentioned previously, examples of defined patterns include still images, videos or other animated sequence of images, varying lighting patterns (e.g., changing colors and/or changing luminosity), etc.

More specific examples of contexts in which the present invention may be used include covering at least partly a façade of a building and/or a wall within the building with one or more sub-panels in order to transform the covered surface into a temporary or a permanent display installation or display screen. The display screen may or not cover windows or openings (hallway, doors, etc.) of the building with display areas. One or more of the sub-panels may be movable with an underlying structure (e.g., a door or a movable panel dedicated to a movable display screen or a movable portion of the display screen). Of course, a display screen may completely or partially be provided between two building (e.g., horizontal or the like portion) and/or as a standalone system.

The display screen may be used as an advertising system, as a television screen (or the like), as an ambient lighting system (e.g., in dance clubs or spa resorts) and/or as a combination thereof (e.g., ambient lighting system at night and advertising system during the day). Of course, the present disclosure is not limited to the few examples listed herein and skilled person will readily be able to adapt the present teachings to various use cases.

The display screen may also be formed by multiple sub-panels that are not necessarily contiguous (e.g., even though the display screen may be perceived as contiguous from a certain view point) and/or that are not necessarily flat (e.g., following the contour of a wall or building or otherwise defining a curved shape). The display screen may be used to broadcast a stream of images received from a remote system. The remote system that provides the stream of images is not part of the scope of the present invention, but a converter allowing the provided images to be adapted into proper lighting instructions for specific characteristics of the display system may be provided in some embodiments. The stream of images may comprise a series of still images or an actual video stream. In accordance with the present disclosure, it is possible to select the capacity of the different components of the display system to broadcast the stream of images such that viewers' perception, at a given selected distance therefrom, is the same as a high definition display screen (i.e., "horizontal pitch" and "vertical pitch" may be set by correctly defining longitudinal and transverse distributions for the "pixels", which are provided by the LED modules, and the LED modules may be selected to provide a desired "refresh rate" when provided with proper lighting instructions).

Embodiments are described below, by way of example only, with reference to FIGS. 1-30.

FIG. 1 is a logical modular view of an exemplary display system 1000 in accordance with the teachings of the present invention. The display system 1000 comprises a display controller 1100 operatively coupled to a plurality of LED strips 1300.1 . . . *n* (collectively 1300). For instance, the display controller 1100 may connect to the plurality of LED strips 1300 through a network 1200 of the display system 1000. The display controller 1100 may, in such an embodiment, comprise a network interface module 1110 with one or more physical ports 1112 used to interface with the network 1200 and send information to and/or exchange information with the plurality of LED strips 1300. Each of the plurality of LED strips 1300.1 . . . *n* comprises a subset of individually controllable LED modules (not shown on FIG. 1, but discussed in more detail later with reference to FIG. 3) positioned therealong, and the information received at the LED strips 1300 can instruct one or more of a subset of individually controllable LED modules on each of the LED strips 1300.1 . . . *n* to emit light. Various network links may be implicitly or explicitly used in the context of the present invention. While a link may be depicted as a wired link, it could also be embodied as a wireless link. A wired or wireless access point (not shown) may be present on any link. Likewise, any number of routers (not shown) may be present and part of the link.

The display controller further comprises a memory module 1120, a processor module 1130, and an encoding module 1140. The memory module 1120 may contain instructions to be executed by the processor module 1130 which configure the display controller 1100 to perform various functionality as described herein. The memory module 1120 may also comprise unique identifiers or addresses for each LED strip 1300.1 . . . *n* and/or each LED module positioned therealong. Assigning unique identifiers or addresses for each LED strip 1300.1 . . . *n* and/or each LED module may allow for information or lighting instructions to be transmitted to the LED strips 1300 in order to provide desired patterns by considering defined distributions of the plurality of strips 1300 and LED modules in the display system 1000, as will become apparent with reference to embodiments discussed hereinbelow. The encoding module 1140 may also access the memory module 1120 to retrieve instructions including but not limited to what information/instructions is to be encoded, rules or instructions for encoding the information, and/or unique identifiers of the LED strips 1300 and individual LED modules therealong.

The processor module 1130 may represent a single processor with one or more processor cores or an array of processors, each comprising one or more processor cores. The memory module 1120 may comprise various types of memory (different standardized or kinds of Random Access Memory (RAM) modules, memory cards, Read-Only Memory (ROM) modules, programmable ROM, etc.). One or more storage devices module (not shown) may represent one or more logical or physical as well as local or remote hard disk drive (HDD) (or an array thereof). The storage devices module may further represent a local or remote database made accessible to the display controller 1100 by a standardized or proprietary interface. The network interface module 1110 represents at least one physical interface that can be used to communicate with the LED strips 1300. The network interface module 1110 may be made visible to the other modules of the display controller 1100 through one or more logical interfaces. The actual stacks of protocols used by the physical network interface(s) and/or logical network interface(s) of the network interface module 1110 do not affect the teachings of the present invention. The variants of processor module 1130, memory module 1120 and network interface module 1110 usable in the context of the present invention will be readily apparent to persons skilled in the art. Likewise, even though explicit mentions of the memory module 1120 and/or the processor module 1130 are not made throughout the description of the present examples, persons skilled in the art will readily recognize that such modules are used in conjunction with other modules of the display controller 1100 to perform routine as well as innovative steps related to the present invention.

Figure 2:
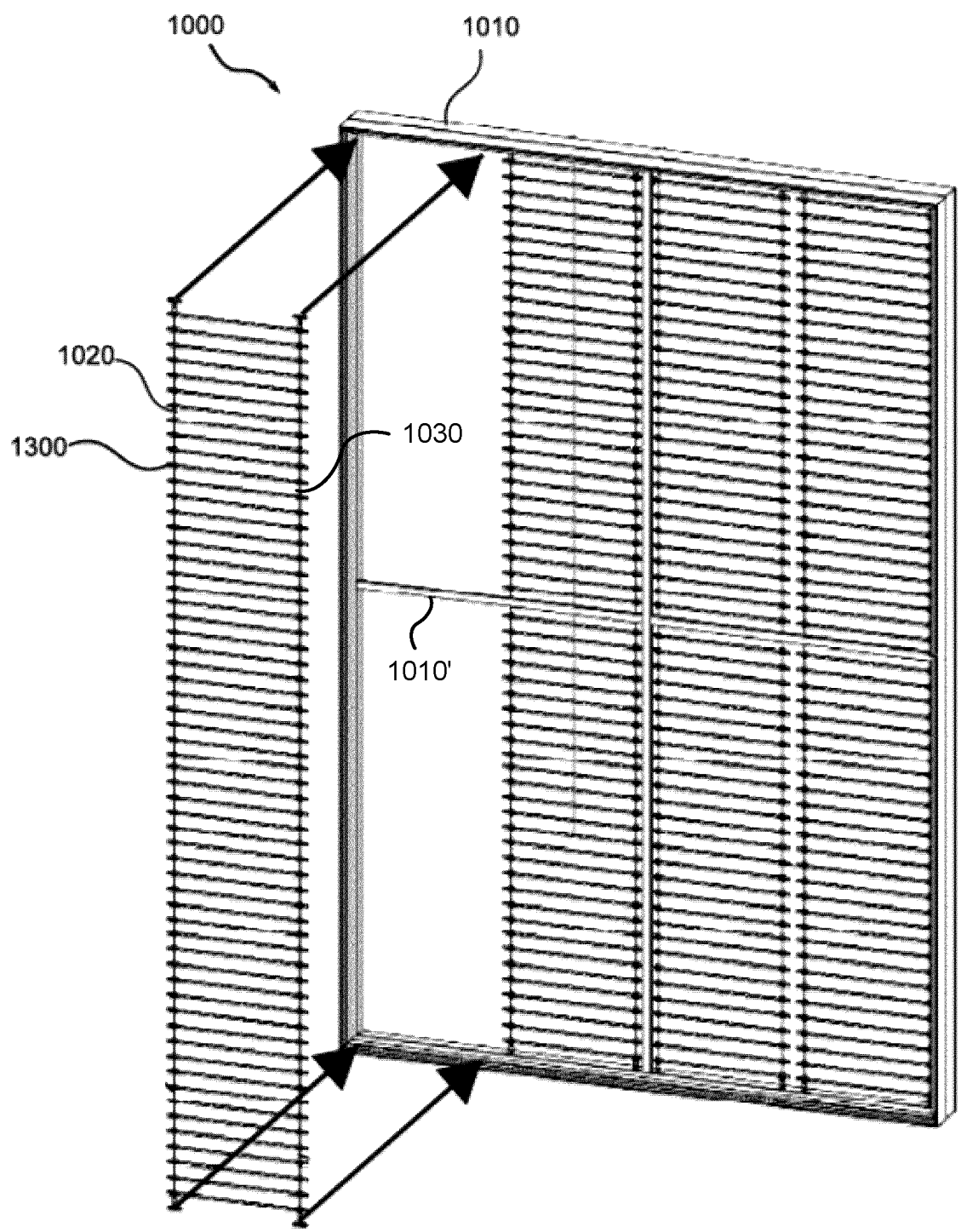
FIG. 2 is a perspective view of an exemplary display system in accordance with the teachings of the present invention.

FIG. 2 is a perspective view of the exemplary display system 1000 in accordance with the teachings of the present invention. The display system 1000 may include at least one first cable 1020, at least one second cable 1030, and the plurality of LED strips 1300 comprising LED modules for displaying defined patterns. In an example, the first cable 1020 and second cable 1030 extend between and are connected to opposite inner surfaces of a frame 1010 along the entire height of the frame 1010. In another example, the first cable 1020 and second cable 1030 may extend between opposite inner surfaces of the frame 1010 along a portion of the height of the frame 1010, in which case the frame 1010 may include one or more intermediary portions (e.g., 1010') having intermediate inner surfaces to which ends of the first and second cables are connected. The plurality of LED strips 1300 may be electrically connected in a longitudinal distribution to the first cable 1020 and second cable 1030 at or near the ends of the LED strips 1300, as will be further described herein and more particularly with reference to FIG. 3 and FIGS. 6 thru 13. The defined longitudinal distribution of LED strips 1300 may establish a longitudinal pitch of 10 mm to 200 mm between longitudinally aligned LED modules from different ones of the plurality of strips. The longitudinal pitch is usually constant throughout the defined longitudinal distribution, but it may also be variable. The plurality of LED strips 1300 connected to the first cable 1020 and second cable 1030 may be mounted to the frame 1010 using a cable tensioning system and frame connector assembly, as will also be further described herein and more particularly with reference to FIGS. 15 thru 23.

The set of cables comprising the first cable 1020 and the second cable 1030 may provide three or more conductive wires insulated from one another comprising at least one reference voltage wire, a positive voltage wire and a data wire.

Figure 14:
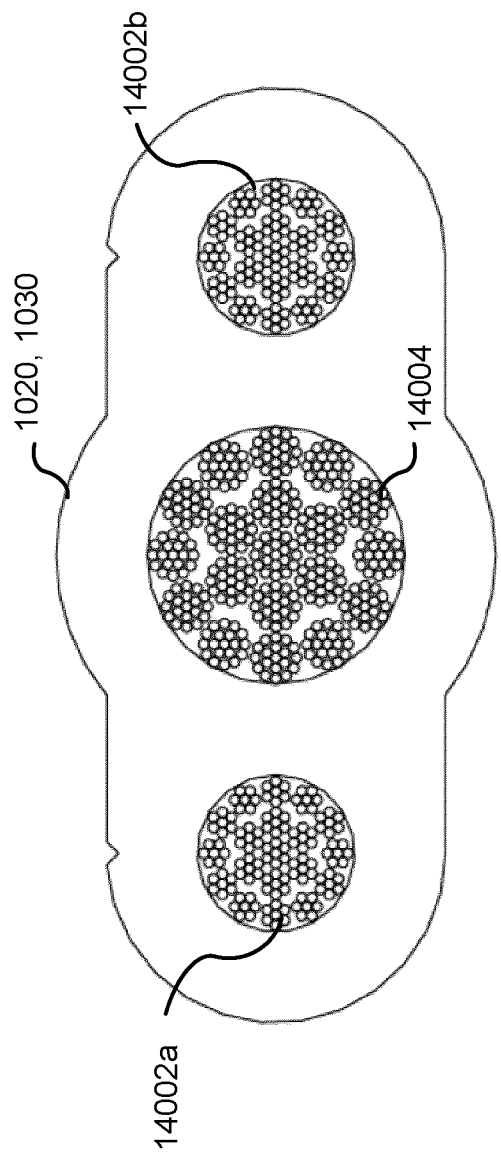
FIG. 14 is a cut view of an exemplary cable in accordance with the teachings of the present invention.

FIG. 14 is a cut view of an exemplary cable in accordance with the teachings of the present invention. The exemplary cable shown in FIG. 14 may be representative of either the first cable 1020 or the second cable 1030. Each cable comprises two wires 14002a and 14002b insulated from one another, though the cables may instead comprise one wire, three wires, etc. As an example, the first cable 1020 may comprise a positive voltage wire and a reference voltage wire, and the second cable 1030 may comprise a reference voltage wire and a data wire, however any combination of wires contained in the respective first and second cables may be used without departing from the scope of this disclosure, as will become more readily apparent herein. The cable insulation may be any type of insulation as commonly used in the art. However, in order to provide proper flexibility together with proper reaction to tensioning, specific material may be better suited. For instance, in some exemplary embodiments, the selected cable insulation can serve does not permanently deform or fracture when subjected to a continuous tension-load of up to 250 pounds and/or when manipulated (e.g., bent or otherwise twisted) when ambient temperature is between −14° C. and +50° C. Of course, different tension-load and/or ranges of temperature may be selected based on the intended use. The cable insulation, in certain embodiments, is also selected considering the desired resistance to exterior elements (e.g., weather-resistant and/or weather-proof).

Each cable may further comprise a tensioning wire 14004. In some embodiments, the tensioning wire 14004 provides no power or data but allows for the cables to be tensioned, as will further be described herein and more particularly with reference to the cable tensioning assembly of FIG. 15.

The tensioning wire 14004 may be made from a high tensile strength material such as steel or nylon for example, while the wires 14002a and 14002b may be made of copper. In some embodiments, the tensioning wire 14004 is used alone or in addition to the wires 14002a and/or 14002b to convey a reference voltage. In some embodiments, the tensioning wire 14004 may therefore comprise a copper core surrounded by a high tensile strength material or a high tensile core surrounded by a high tensile strength material. In certain embodiments, the three cable wires 14002a, 14002b, and 14004 have a jacket, and each copper wire has an additional nylon jacket, all of which may be compliant with UL standards.

Figure 24:
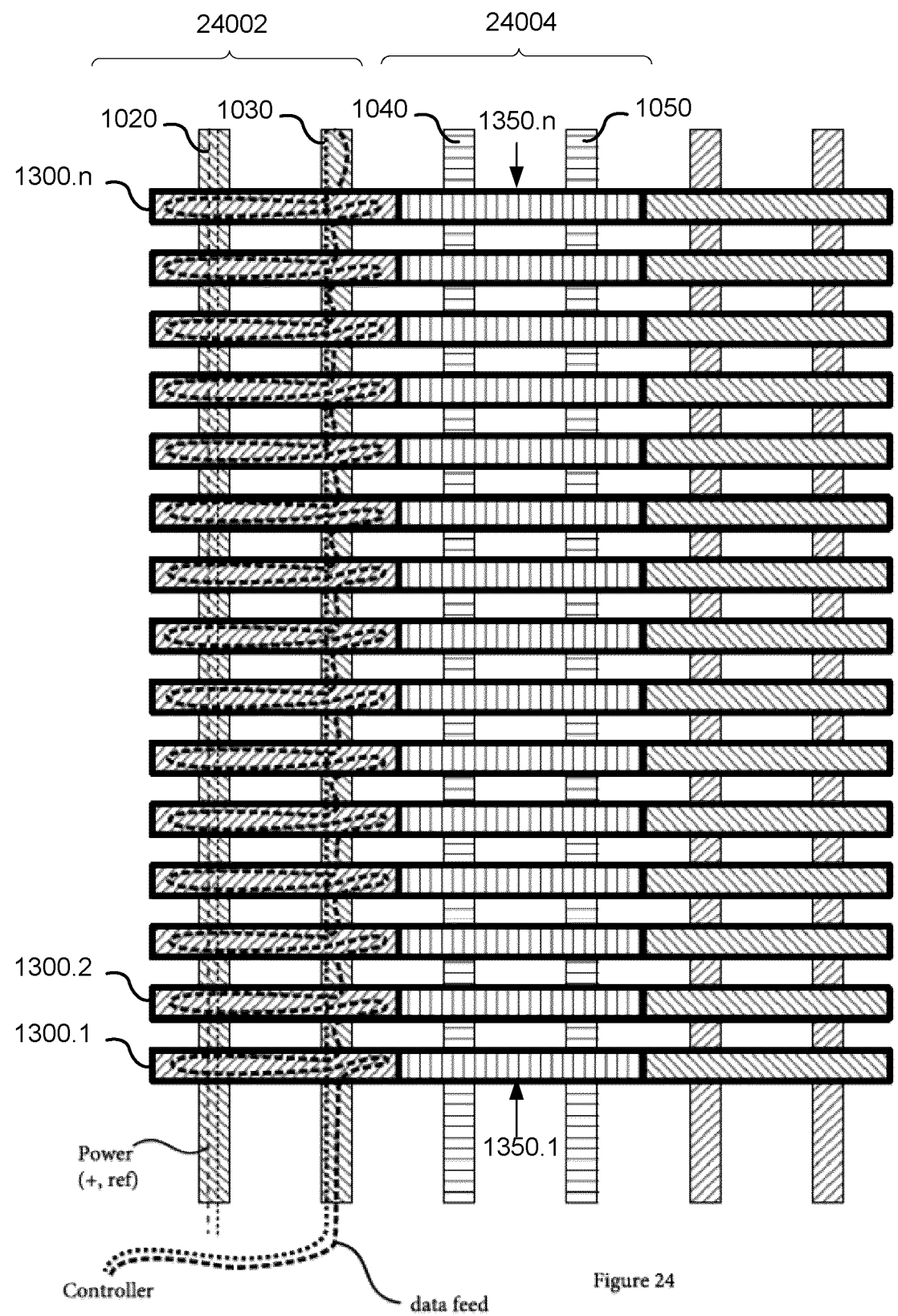
FIG. 24 is a logical representation of an exemplary vertical installation in accordance with the teachings of the present invention.
Figure 25:
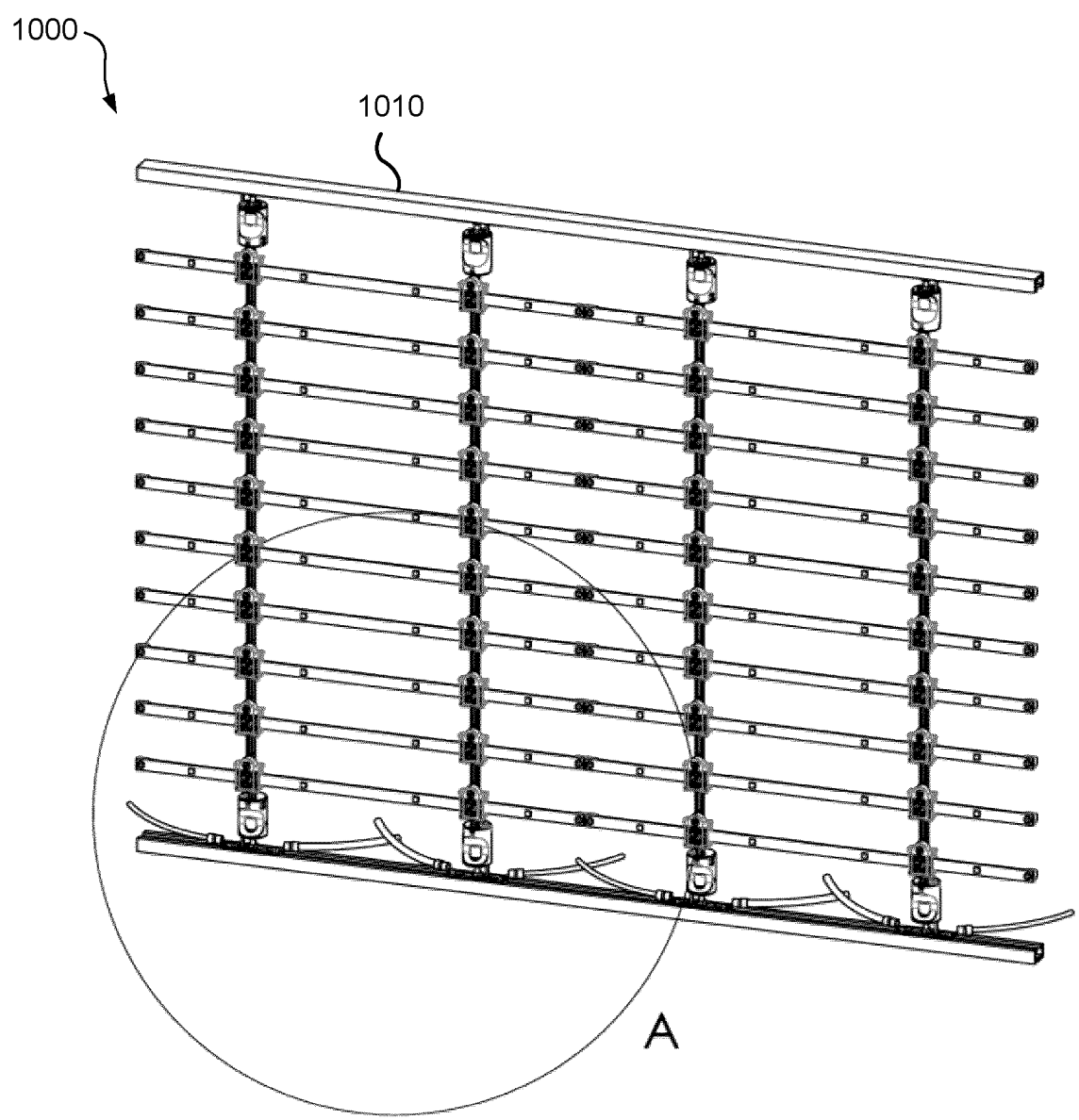
FIG. 25 is another perspective view of an exemplary display system in accordance with the teachings of the present invention.
Figure 26:
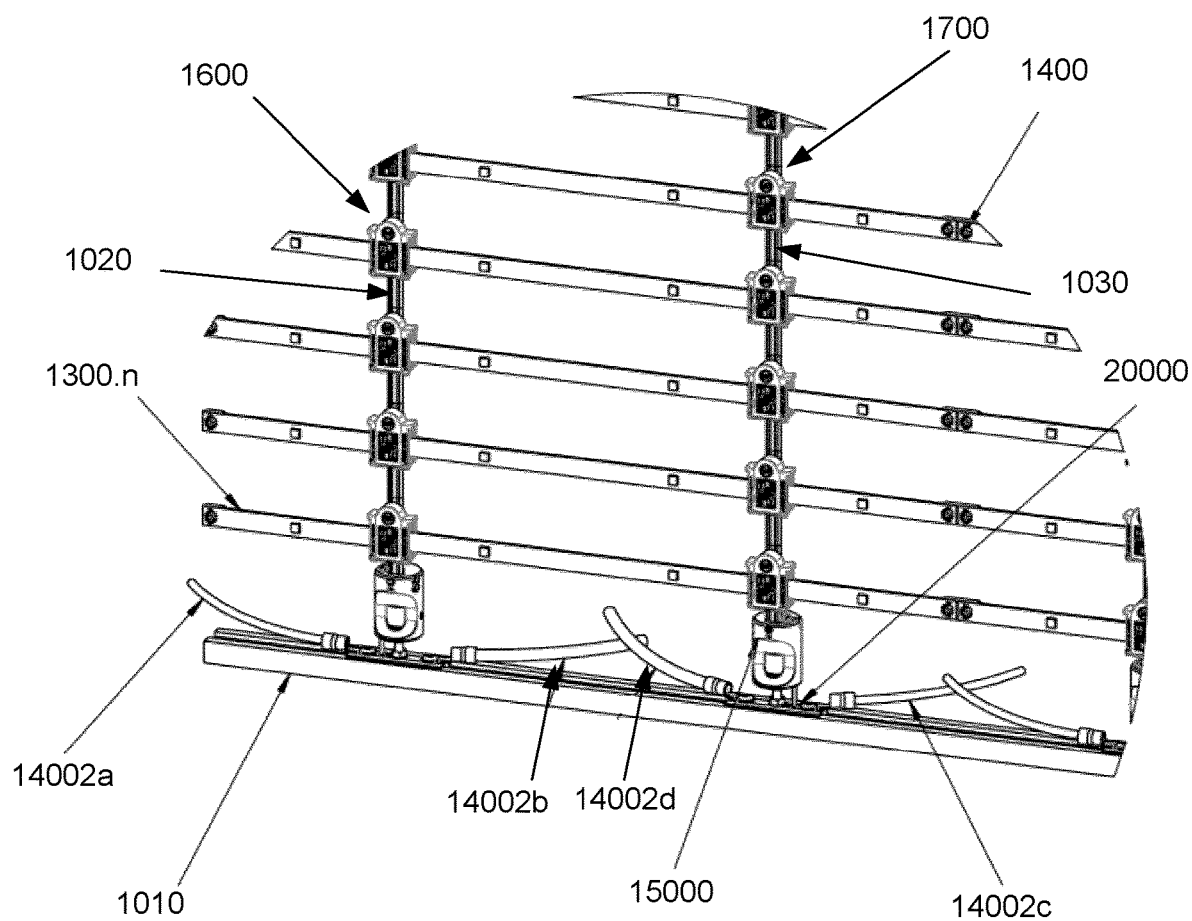
FIG. 26 is a detailed view of an exemplary display system in accordance with the teachings of the present invention.

Reference is now made concurrently to FIG. 2, FIG. 3, and FIGS. 24 thru 26. FIG. 3A and FIG. 3B, herein referred to concurrently as FIG. 3, are respective front and back views of an exemplary LED strip 1300.n in accordance with the teachings of the present invention. FIG. 24 shows a logical representation of the display system 1000 of FIG. 2, providing an exemplary vertical installation in accordance with the teachings of the present invention. FIG. 25 is another perspective view of an exemplary display system in accordance with the teachings of the present invention. FIG. 26 is a detailed view of an exemplary display system in accordance with the teachings of the present invention The display system 1000 may provide a temporary or permanent display installation. As depicted in the example of FIGS. 2 and 24, the display system 1000 is configured by installing a first set of cables 24002 comprising at least the first cable 1020 and a second cable 1030, which provide three or more conductive wires insulated from one another comprising at least one reference voltage wire, a positive voltage wire and a data wire, as mentioned previously with reference to FIG. 2 and FIG. 14. The reference voltage, the positive voltage and the data are received from the set of cables 24002 by the plurality of strips 1300. Optionally, each of the plurality of strips 1300 may be a Printed Circuit Board (PCB). As shown in FIG. 3, each of the plurality of strips 1300.n comprises a subset of individually controllable LED modules 1302.1 . . . n (collectively 1302) positioned therealong in a defined transverse distribution. In some embodiments there may be a minimum of two LED modules 1302.1, 1302.2 and a maximum of eight LED modules 1302.1 . . . 1302.8 per each LED strip 1300.n. For example, the LED modules 1302 are spaced apart at a defined distance 1304. The defined transverse distribution may establish a transverse pitch of 10 mm to 200 mm between LED modules in the subset of LED modules 1302. The transverse pitch is usually constant throughout the defined transverse distribution, but it may also be variable. The vertical pitch of the plurality of LED strips 1300 and transverse pitch of the plurality of LED modules 1302 may be equal or different.

The LED strips 1300 may be powered by a power supply which delivers power through the positive voltage wires and reference voltage wires. Typically, the power supply is integrated in a single physical enclosure with the display controller 1100 and also power the display controller 1100, but skilled person will readily acknowledge that other configurations are possible. Lighting instructions for the plurality of individually controllable LED modules are sent over the data wire, the lighting instructions being set considering the defined longitudinal distribution of the plurality of strips 1300 and the defined transverse distribution of LED modules 1302 along each of the plurality of strips in order to provide the defined patterns. Each LED strip 1300.n may comprise a local processor 1306 for processing a subset of the lighting instructions received from the display controller 1100. In some embodiments, each of the LED modules 1302.n may have a unique identifier or unique address (i.e., unique between all display systems, for a single display system or, at least, unique for one of multiple controllers a single display system). Accordingly, individually controllable LED modules 1302.n positioned along each LED strip 1300.n may be individually controlled based on the lighting instructions contained in the data feed.

As previously described, the lighting instructions in the data feed may be generated by the display controller 1100 considering the defined longitudinal distribution of the plurality of LED strips 1300 and the defined transverse distribution of LED modules 1302 along each of the plurality of strips 1300 in order to provide defined patterns. Prior to sending lighting instructions, configuration instructions may be sent to the plurality of strips 1300 over the data wire for assigning a unique identifier to each of the plurality of individually controllable LED modules 1302.n. Optionally, prior to sending lighting instructions, each of the plurality of individually controllable LED modules 1302.n may be mapped to defined coordinates in the display system 1000 considering the defined transverse distribution and the defined longitudinal distribution. In such an embodiment, prior to sending lighting instructions, a video stream may be encoded into the lighting instructions considering the defined coordinates. In an embodiment, as can be seen in FIG. 24, the data wire may be cut by a connector assembly at each of the LED strips 1300 so that the lighting instructions may transit through the LED strip 1300.n, thereby allowing the plurality of LED strips 1300 to be logically daisy-chained. When multiple display controllers are provided, they may be connected to one another using a dedicated link. The multiple display controllers may alternatively or in addition be daisy-chained along a single "logical" data wire formed from multiple data wires connected in series though one or more display controllers (not shown).

Each of the LED modules 1302.n comprises at least one single individual LED module. In some embodiments, each of the plurality of individually controllable LED modules may be a surface-mount device light-emitting diode module comprising one to four individual LEDs. For instance, the LED module may comprise a single RGB LED, a single RGB LED and one or more white (W) LED, separate R, G, B LEDs or separate R, G, B LEDs and one or more W LED. IN some embodiments, it may be sufficient to provide a subset of the RGB capabilities (e.g., specific use where some wavelengths produced along one or more of the R, G and/or B are not desired such as photography, night vision, etc.). The LED module may therefore comprise any combination of R, G, B, (in single or different LEDs) and/or W (e.g., a single warm-white, cold-white, etc.) for which intensity can be controllably set in order to produce different controlled colors, different controlled color temperatures and/or different controlled luminosities. However, it is expected that each of the LED modules 1302 comprise three (e.g., RGB) or four (RGB and White) individual LEDs. Skilled people will understand that any combination of individual LEDs that provide a colored (e.g., temperature-controlled white and/or full color) output would be adequate in the context of exemplary embodiments discussed herein. The LED modules 1302 of exemplary display systems provided in accordance with the teachings of the present disclosure are typically expected to generate a colored output at a given intensity based on received lighting instructions. The lighting instructions allow for individual control of the LED modules 1302.n. That is, the LED module 1302.1 and an LED module 1302.2 are individually controllable allowing the two modules 1302.1 and 1302.2 to display different lighting in accordance with the received lighting instructions. The LED modules 1302.n may alternatively or in additional be able to generate a specific "white" light at a given light "temperature", as skilled people will readily understand.

The display system 1000 may also comprise more than one plurality of LED strips as shown in FIG. 24 (e.g., different "sub-panels"). Namely, there is a first plurality of strips 1300 maintained between the first set of cables (first cable 1020 and second cable 1030) defining a first sub-panel 24002, and a second plurality of strips 1350.1 . . . n (collectively, 1350) maintained between a second set of cables, defining a second sub-panel 24004, comprising a third cable 1040 and a fourth cable 1050 that are parallel to the first and second cables 1020 and 1030. In the depicted example, the longitudinal distribution of the first sub-panel 24002 matches the longitudinal distribution of the second sub-panel 24004. The third and fourth cables 1040 and 1050 provide at least three additional conductive wires insulated from one another comprising at least a second reference voltage wire, a second positive voltage wire, and a second data wire. The second plurality of strips 1350 receive the reference voltage from the second reference voltage wire, the positive voltage from the second positive voltage wire and the data from the second data wire. Each of the second plurality of strips 1350.n comprises an additional subset of the individually controllable LED modules positioned therealong in a second defined transverse distribution matching the defined transverse distribution. Of course, skilled persons will readily acknowledge that any number of sub-panels may be juxtaposed transversely and/or longitudinally with or without gaps and/or in parallel or defining various for a customized display areas. The different sub-panels may also alternatively or additionally be partially or completely overlapped (e.g., to increase pitch). In some display systems providing a multiple-face display area, the LED strips may provide LED modules on two opposite surfaces or different LED strips may be aligned back to back (e.g., using alignment mechanism(s) adapted from FIGS. 4 and 5). It is also possible to provide more than two display faces in customized display systems (e.g., triangular, square LED strips, or LED prisms, maintained on angled cables). It will be appreciated by one of ordinary skill in the art that the teachings of the present invention may be applicable to any number of plurality of strips.

The first plurality of strips 1300 and the second plurality of strips 1350 may be in contact or closed proximity (e.g., connected) at each extremity of the plurality of strips to align adjacent strips. The alignment may be achieved for example by using a terminal alignment magnet 1400 shown in FIG. 26 and further described herein with reference to FIGS. 4 and 5, a mechanical connection, or a combination of both.

The display system 1000 may further comprise a plurality of first connectors 1600 and second connectors 1700 shown in FIG. 26. The connectors 1600 and 1700 are permanently maintained on the respective first cable 1020 and second cable 1030 in accordance with the defined longitudinal distribution of LED strips 1300 as further described herein with reference to FIGS. 6 thru 13. The connectors allow for the possibility to detachably attach one end of the LED strip 1300.n to the first connector 1600 for providing a connection to the first cable 1020, thereby receiving, for example, the positive voltage and the reference voltage (indicated as wires 14002a and 14002b in FIG. 26) from the first cable 1020 at a first end of the LED strip 1300. Another end of the LED strip 1300.n may be detachably attached to the second connector 1700 for providing a connection to the second cable 1030, thereby receiving, for example, the data wire and a second reference voltage wire (indicated as wires 14002c and 14002d in FIG. 26) at a second end of the LED strip 1300.n. As an additional option, every one of the first connectors may be specifically shaped (e.g., keyed considering the cooperating component) for a corresponding first structure of the LED strip 1300.n and every one of the second connectors may be specifically shaped (e.g., keyed considering the cooperating component) for a corresponding second structure of the LED strip 1300.n different from the first structure for ensuring expected connectivity between the LED strip (which may for example be a PCB) and the set of cables.

Referring more specifically to FIG. 3, in FIG. 3A two details 3A' and 3A" are shown which correspond to locations along the LED strip 1300.n that the first and second connector assemblies may be attached to. As previously described, the first and second connectors may be shaped or keyed specifically to corresponding first and second ends of the LED strip 1300.n to help ensure that the LED strips are installed in the appropriate configuration. The first and second ends of the LED strip 1300.n where the first and second connectors respectively attach are shown in the details 3A' and 3A". For example, indents 1308 in the structure of the LED strip 1300.n that are in a different arrangement or configuration on respective ends of the LED strip 1300. Accordingly, it may be possible that only a first connector may attach to the LED strip 1300.n at a first end (for example at the location shown in detail 3A'), and only a second connector may attach to the LED strip 1300.n at a second end (for example at the location shown in detail 3A").

On the rear side of the LED strip 1300.n at these locations are contacts 1310a, 1310b, which may allow for a connection between the LED strip 1300.n and the wires contained within the first and second cables 1020, 1030, wherein the connection is made through the first and second connectors. As can be seen, the contacts 1310a and 1310b may also have different configurations (in the exemplary contacts shown, they have a different number of contact points), which may be used to ensure that only a first connector may be attached at a first end of the LED strip 1300.n and that only a second connector may be attached at a second end of the LED strip 1300.n.

A third detail 3A''' is also shown which corresponds to an extremity of the LED strip 1300.n. As previously described, it may be desirable that extremities of a first plurality of LED strips 1300 be aligned with an adjacent second plurality of LED strips 1350. The alignment may be achieved for example with a mechanical and/or magnetic connection between adjacent LED strips 1300.n and 1350.n. The extremities of the LED strips 1300.n and 1350.n may be configured to provide such functionality as will be further described in FIGS. 4 and 5. Though not explicitly shown in FIG. 3A, respective extremities of the LED strip 1300.n (i.e., the extremity with the detail 3A''' and the opposite extremity) may have different structures, for example based on the location, size, and/or shape of the dents 1312 and/or through holes 1314 in the LED strip 1300. In some embodiments, the LED strip 1300.n is adapted for varying use conditions (e.g., moisture resistant, water-resistant, water-proof and/or dust-resistant, etc.). For instance, the LED strip 1300.n may be weather-resistant and/or weather-proof and provide sealed components with the exception of the contacts 1310a and 1310b. As will become more readily apparent hereinbelow, the contacts 1310*a* and 1310*b* may then be sealed by using properly configured connectors and seals. The LED strip 1300.*n* may provide specifically shaped or configured contacts 1310*a* and 1310*b* (e.g., recessed into the strip and/or surrounding elevations on the strip) to improve or maintain weather-resistant and/or weather-proof characteristics of the assembly.

Figure 4A:
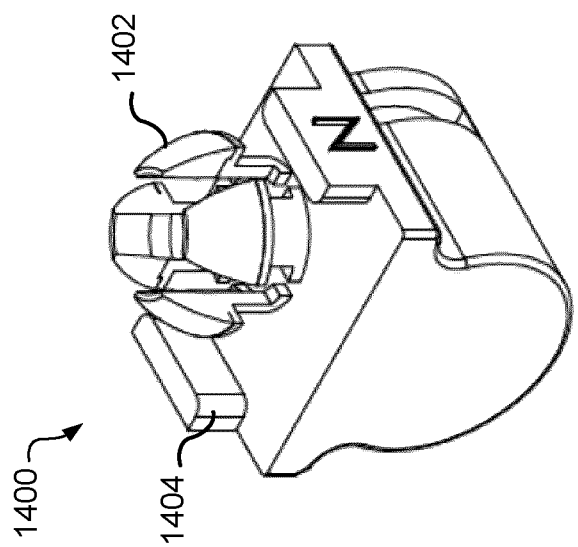
FIG. 4A, FIG. 4B, FIG. 4C and FIG. 4D, herein referred to concurrently as FIG. 4, are views of a first exemplary terminal alignment magnet enclosure in accordance with the teachings of the present invention.
Figure 4B:
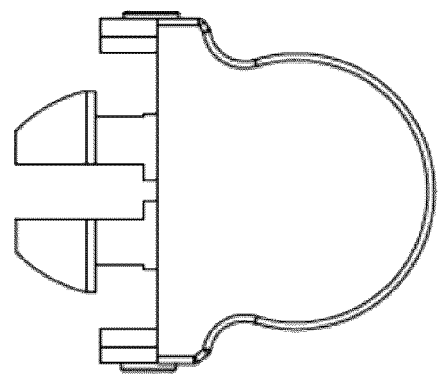
Figure 4D:
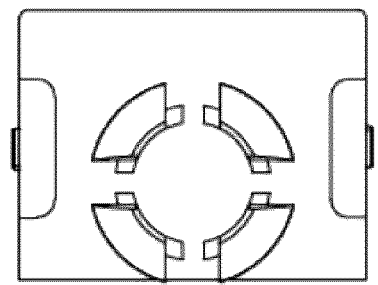
Figure 4C:
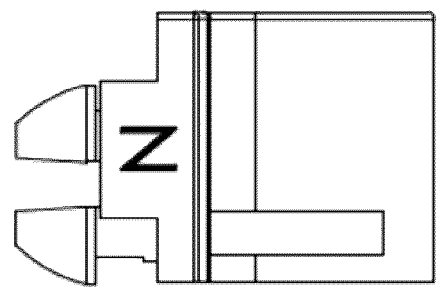

FIG. 4A, FIG. 4B, FIG. 4C and FIG. 4D, herein referred to concurrently as FIG. 4, are views of a first exemplary terminal alignment magnet enclosure 1400 in accordance with the teachings of the present invention. In particular, FIG. 4A shows a perspective view of the exemplary terminal alignment magnet, FIG. 4B and FIG. 4C are front and side views of the exemplary terminal alignment magnet, and FIG. 4D shows a top view of the exemplary terminal alignment magnet.

The terminal alignment magnet enclosure 1400 may contain a polarized magnet enclosed within the enclosure and provide one possibility of aligning the extremities of a first and second plurality of LED strips 1300 and 1350. For example, one extremity of a first LED strip 1300.*n* belonging to the first plurality of LED strips 1300 may receive a terminal alignment magnet enclosure corresponding to a first polarity (e.g., north), and an extremity of a second LED strip 1350.*n* belonging to the second plurality of LED strips 1350 that is adjacent to the first LED strip 1300.*n* may receive a terminal alignment magnet enclosure that corresponds to a second polarity (e.g., south). Accordingly, the extremities of the first and second LED strips 1300.*n* and 1350.*n* which are adjacent to each other may be magnetically attracted and thereby improve the alignment of different LED strips from different sub-panels. Each LED strip 1300.*n* and 1350.*n* may have a terminal alignment magnet corresponding to a first polarity at one extremity of the strip and a terminal alignment magnet corresponding to a second polarity at the opposite extremity of the strip. Each LED strip 1300.*n* in the plurality of LED strips 1300 may be configured to have the same polarity at the same extremities. In addition to or alternatively to using magnets to align adjacent LED strips, other means such as a mechanical connection (e.g., having a female component on one strip and a male component on the other) could be implemented.

The terminal alignment magnet enclosure 1400 may be inserted or attached to the extremities of the LED strip 1300.*n*. As described with reference to FIG. 3, the LED strip 1300.*n* may have extremities with different structures, thus restricting what polarity of terminal alignment magnet may be attached thereat. As can be seen in FIG. 4A, the squeezable tabs 1402 may be pushed through the corresponding through-hole 1314 of the LED strip 1300.*n*. Likewise, the tabs 1404 may slidably engage with dents 1312 of the LED strip 1300.*n*. The location, size, and/or shape of dents 1312 and through-hole 1314 at the extremities of the LED strip 1300.*n* may restrict which type of attachment (e.g., which polarity of terminal alignment magnet enclosure) may be inserted into that respective extremity, thereby preventing a terminal alignment magnet enclosure of the wrong polarity to be inserted into an extremity of the LED strip 1300.*n*.

Figure 5A:
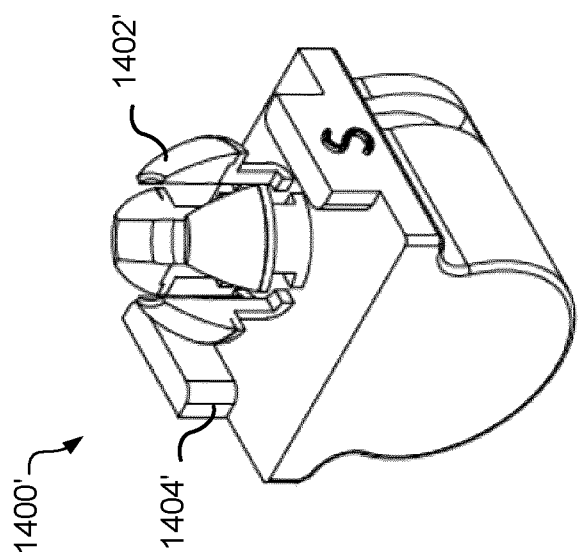
FIG. 5A, FIG. 5B, FIG. 5C and FIG. 5D, herein referred to concurrently as FIG. 5, are views of a second exemplary terminal alignment magnet enclosure in accordance with the teachings of the present invention.
Figure 5B:
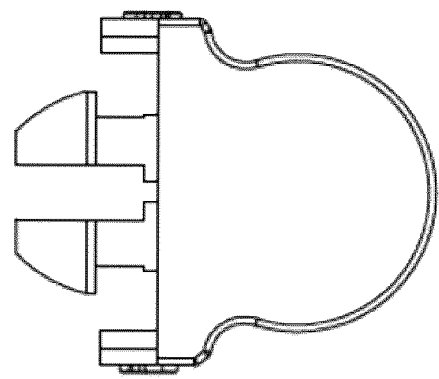
Figure 5D:
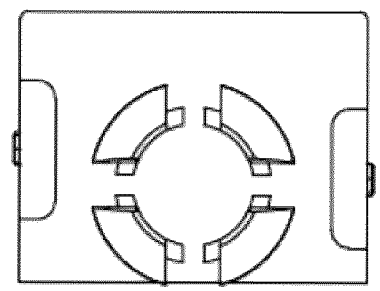
Figure 5C:
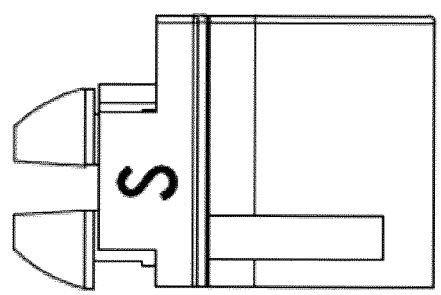

FIG. 5A, FIG. 5B, FIG. 5C and FIG. 5D, herein referred to concurrently as FIG. 5, are views of a second exemplary terminal alignment magnet enclosure 1400' in accordance with the teachings of the present invention. In particular, FIG. 5A shows a perspective view of the exemplary terminal alignment magnet, FIG. 5B and FIG. 5C are front and side views of the exemplary terminal alignment magnet, and FIG. 5D shows a top view of the exemplary terminal alignment magnet.

The terminal alignment magnet enclosure 1400' may be similar to the terminal magnet enclosure 1400 described with reference to FIG. 4, but may contain a polarized magnet of the opposite polarity (for example, south) enclosed within the enclosure. In addition, the squeezable tabs 1402' and/or the tabs 1404' may be of a different location, size, or shape than the corresponding squeezable tabs 1402 and tabs 1404 of the terminal alignment magnet enclosure 1400, therefore each terminal alignment magnet enclosure 1400 and 1400' may only be inserted into a respective extremity of the LED strip 1300.*n*.

FIG. 6 is an exploded perspective view of an exemplary first connector assembly 1600 in accordance with the teachings of the present invention. The first connector assembly 1600 may comprise a first receiver strip 1602, a cable-side holder 1604, a strip-side holder 1606, and a PCB-side seal 1608. Elements 1602, 1604, 1606 and 1608 will be further described below. The first connector assembly 1600 may further optionally include a bracket mount 1610 for mounting to a back frame, wall, etc.

As previously described, the first connector assembly 1600 may be used to detachably attach an LED strip 1300.*n* to a first cable 1020. The first connector assembly 1600 may be maintained permanently on the first cable 1020. The first connector assembly 1600 may be further designed so as to only be attachable to a first end or first structure of the LED strip 1300.*n*, as will be further described herein. It can also be noted that the LED strip 1300.*n* shown in FIG. 6 has a different structure by way of the location of indents 1308 than what was previously shown in FIG. 3. Again, several variations for the structure of the LED strip 1300.*n* may exist and the connector assembly may be designed accordingly.

Figure 7:
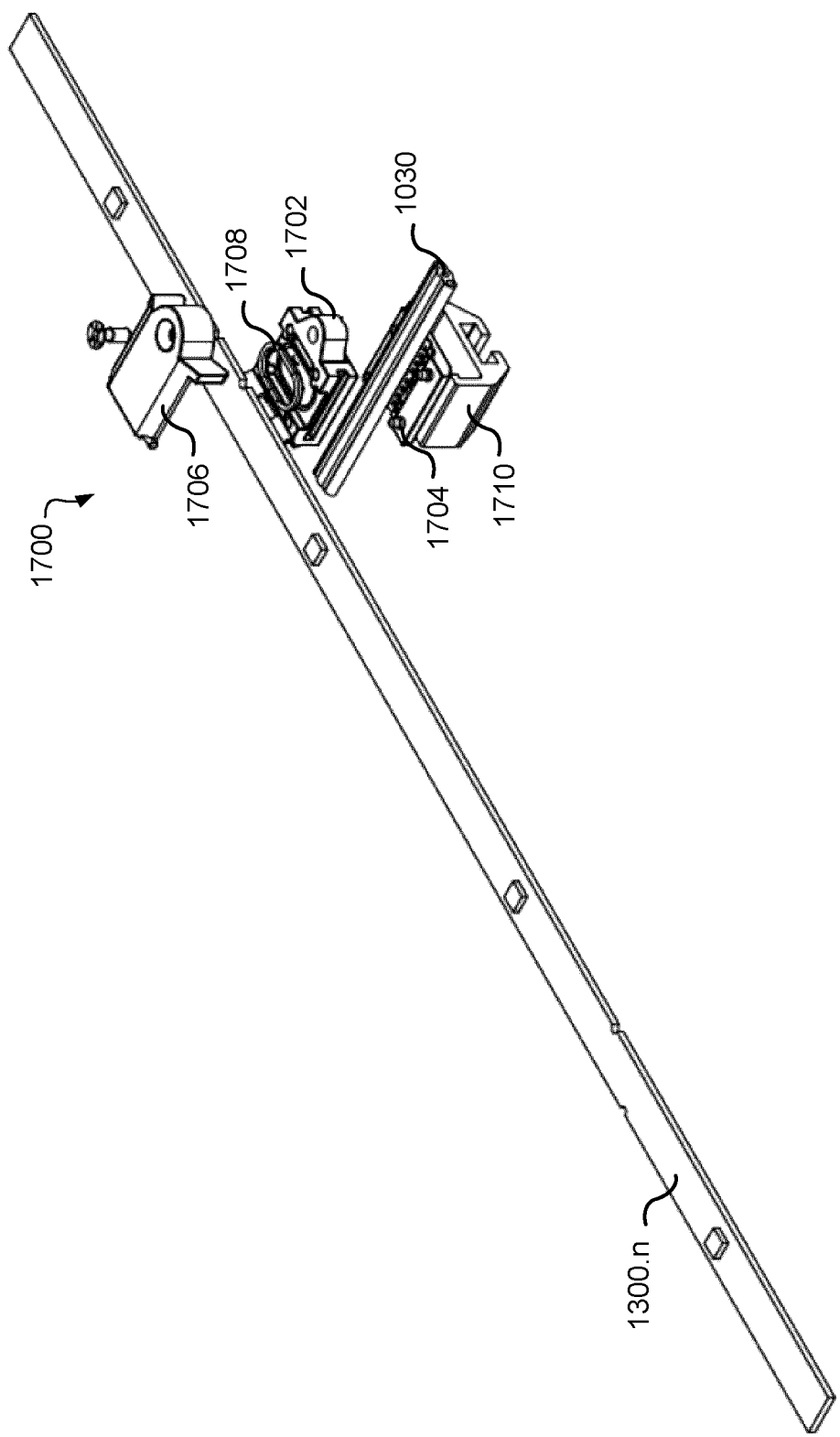
FIG. 7 is an exploded perspective view of an exemplary second connector assembly in accordance with the teachings of the present invention.

FIG. 7 is an exploded perspective view of an exemplary second connector assembly 1700 in accordance with the teachings of the present invention. The second connector assembly 1700 may comprise a second receiver strip 1702, a cable-side holder 1704, a strip-side holder 1706, and a PCB-side seal 1708. Elements 1702, 1704, 1706 and 1708 will be further described below, and may be the same or different than the first receiver strip 1602, the cable-side holder 1604, the strip-side holder 1606, and the PCB-side seal 1608 of the first connector assembly. The second connector assembly 1700 may further optionally include a bracket mount 1710 for mounting to the back frame, the wall, etc. Skilled persons will recognize that, to secure a given LED strip thereto, only one or both of the bracket mount 1610 and 1710 may be provided. In some embodiments, the seals 1608, 1708 are shaped or keyed to match the contacts 1310*a* and 1310*b* on the LED strip and the shape of an upper surface of the connectors 1602, 1702 in order to maintain the desired weather-resistant and/or weather-resistant characteristics of the assembly.

As previously described, the second connector assembly 1700 may be used to detachably attach an LED strip 1300.*n* to a second cable 1030. The second connector assembly 1700 may be maintained permanently on the second cable 1030. The second connector assembly 1700 may be further designed so as to only be attachable to a second end or second structure of the LED strip 1300, as will be further described herein.

FIG. 8A, FIG. 8B, FIG. 8C, FIG. 8D and FIG. 8E, herein referred to concurrently as FIG. 8, are views of an exemplary second strip receiver 1702 in accordance with the teachings of the present invention. In particular, FIG. 8A shows a perspective view, FIG. 8B shows a side view, FIG. 8C shows a top view, FIG. 8D shows a cross sectional view along the lines indicated in FIG. 8C, and FIG. 8E shows a bottom view.

As can be seen from FIG. 8B, the second strip receiver 1702 may further comprise piercing contact points 1802 extending from a bottom surface thereof. As previously described with reference to FIG. 14, the first cable 1020 and second cable 1030 are insulated cables that keep the positive voltage wire, the reference voltage wire, and/or the data wire insulated from one another and their surroundings. Therefore, in order to contact the wires within the respective first or second cable the piercing contact points 1802 may be used to pierce or puncture the insulation. While only two piercing contact points 1802 are shown in the second strip receiver 1702 of FIG. 8, more or less piercing contact points could be used depending on the number of wires in the second cable 1030 that the second strip receiver 1702 receives.

Another feature of the second strip receiver 1702 is the top surface as may be seen from FIG. 8C. As previously described, the second connector assembly 1700 may be configured to only be attachable to a second end of the LED strip 1300.$n$, which may be achieved by designing the interface of the second strip receiver 1702 to be compatible only with a second end of the LED strip 1300.$n$. For example, the top surface of the second strip receiver 1702 comprises protrusions 1804 that match the structure of the indents 1310 at a second end of the LED strip 1300.$n$. It may be seen that the protrusions 1804 correspond to the indents seen on the far end of the LED strip 1300.$n$ in FIG. 6. The second strip receiver 1702 also comprises contacts 1806 that may correspond to corresponding contacts on the LED strip 1300.$n$, which may also be referred to as PCB contacts if the LED strip 1300.$n$ is a PCB. For example, there are two contacts 1806 shown in FIG. 8C. These may correspond to the two contacts 1310*a* as shown in FIG. 3B. The number and location of the contacts 1806 may be designed considering that the data feed provided by the data cable transits through each of the LED strips (e.g., in series or daisy-chained) as will become more readily apparent from 1906 while the positive voltage from the positive wire connects the LED strips in parallel. Alternatively or in addition, the number and location of the contacts 1806 may again be designed so that the second strip receiver 1702 and hence second connector assembly 1700 may only be compatible with the second end of the LED strip 1300.

Furthermore, as may be seen for example on the bottom surface of the second strip receiver 1702 in FIG. 8E, there may be holes or slots 1808 for receiving corresponding pins or spikes from the cable-side holder 1704. Together the second strip receiver 1702 and the cable-side holder 1704 may enclose the corresponding portion of the second cable 1030. As may also be seen for example on the top and bottom surface of the second strip receiver 1702, there may be a hole 1810 for receiving a corresponding screw from the second strip-side holder 1706, allowing the second cable assembly 1700 to be detachably attached to the LED strip 1300.$n$.

FIG. 9A, FIG. 9B, FIG. 9C, FIG. 9D and FIG. 9E, herein referred to concurrently as FIG. 9, are views of an exemplary first strip receiver 1602 in accordance with the teachings of the present invention. In particular, FIG. 9A shows a perspective view, FIG. 9B shows a side view, FIG. 9C shows a top view, FIG. 9D shows a cross sectional view along the lines indicated in FIG. 9C, and FIG. 9E shows a bottom view.

Similar to the second strip receiver 1702 shown in FIG. 8, the first strip receiver 1602 may also comprise piercing contact points 1902 which may be used to pierce the first cable 1020 insulation and contact the wires within. Also similar to the second strip receiver 1702, the first strip receiver 1602 may also have a top surface that comprises protrusions 1804 corresponding to indents 1310 on a first end of the LED strip 1300.$n$, as well PCB contacts 1906 that may correspond to contacts on a first end of the LED strip 1300.$n$, for example the contact 1310*b* shown in FIG. 3B. The first strip receiver 1602 may also comprise holes or slots 1808 for receiving corresponding pins or spikes from the cable-side holder 1604. The first strip receiver 1602 may further comprise a hole 1910 for receiving a corresponding screw from the first strip-side holder 1606, allowing the first cable assembly 1600 to be detachably attached to the LED strip 1300.$n$.

Another feature of the connector assemblies, which is exemplary shown as part of the first receiver strip 1602, is that the bottom surface may further comprise a wire spacer 1912 extending therefrom. In some embodiments, the wire spacer 1912 may cut the data wire upon assembly over the cable (e.g., simple cut or by removing a segment of the data wire). However, it has been shown during tests that pre-cutting the data wire by removing a segment therefrom provides better results (e.g., no curling effects in the cable). The wire spacer 1912 therefor acts as an insulator between open intermediate ends of the data wire. As previously described, the data wire containing the lighting instructions may traverse each LED strip 1300.$n$ to individually control the LED modules. The wire spacer 1912 may be used to achieve the arrangement of the data wire by insulating intermediate ends of the data wire so that the data feed from the data wire transits through each LED strip 1300.$n$ and the data wire interconnects sequential LED strips. In this way the plurality of LED strips 1300 may be logically daisy-chained (e.g., connected in series). Note that there is no requirement that the first strip receiver 1602 must comprise the wire spacer 1912. The wire spacer 1912 may be used in either the first or second contact assembly in order to cut the data wire stored in the corresponding first or second cable.

Figure 10B:
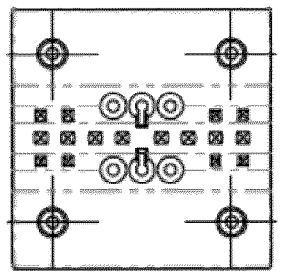
FIG. 10A, FIG. 10B and FIG. 10C, herein referred to concurrently as FIG. 10, are views of an exemplary cable-side holder in accordance with the teachings of the present invention.
Figure 10C:
Figure 10A:
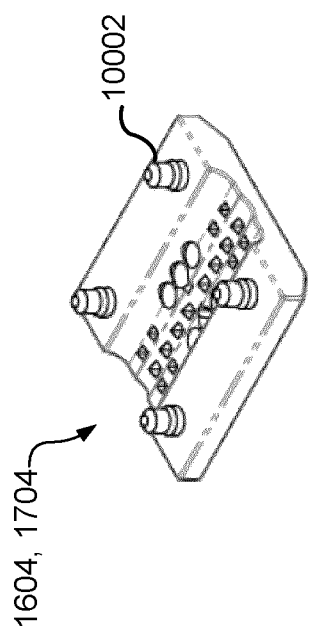

FIG. 10A, FIG. 10B and FIG. 10C, herein referred to concurrently as FIG. 10, are views of an exemplary cable-side holder in accordance with the teachings of the present invention. In particular, FIG. 10A is a perspective view, FIG. 10B is a top view, and FIG. 10C is a side view.

The first cable-side holder 1604 and the second cable-side holder 1704 may be the same or slightly different, but for the purposes of illustration FIG. 10 shows a single cable-side holder that may be used in either the first connector assembly 1600 or the second connector assembly 1700. As described with reference to FIGS. 8 and 9, the cable-side holders 1604 and 1704 may have pins or spikes 10002 that insert into the corresponding holes or slots 1608 and 1708 of the respective first and second receiver strips 1602 and 1702. The pins or spikes may be snap-fit or compression-fit for example and may be hard or soft, though are not limited to such. In some embodiments, the cable-side holders 1604, 1704 are shaped or keyed to match characteristics of the cable insulation in order to maintain the desired weather-resistant and/or weather-resistant characteristics of the assembly. Likewise, the lower surface of the connectors 1602, 1702 may also be shaped or keyed to match characteristics of the cable insulation in order to maintain the desired weather-resistant and/or weather-resistant characteristics of the assembly.

Figure 11B:
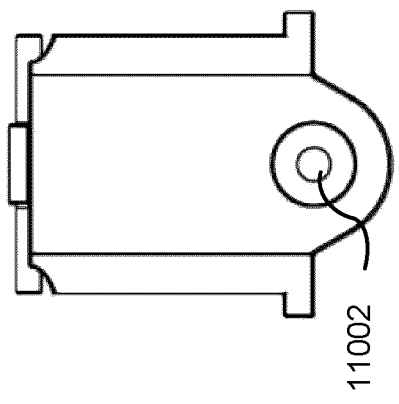
FIG. 11A, FIG. 11B, FIG. 11C and FIG. 11D, herein referred to concurrently as FIG. 11, are views of an exemplary strip-side holder in accordance with the teachings of the present invention.
Figure 11D:
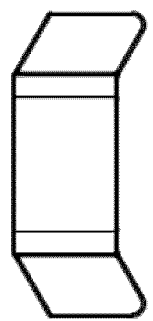
Figure 11A:
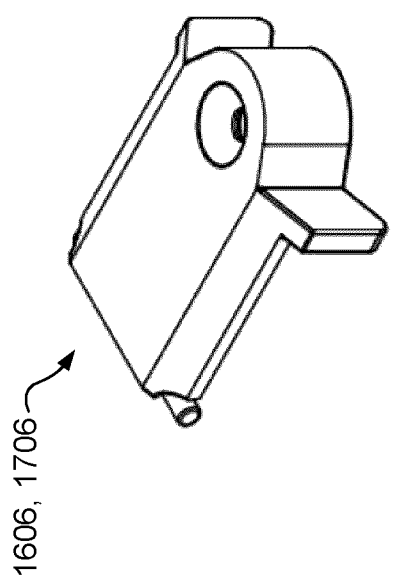
Figure 11C:
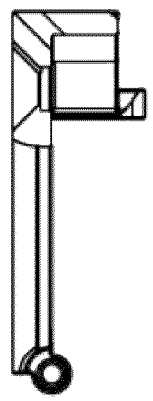

FIG. 11A, FIG. 11B, FIG. 11C and FIG. 11D, herein referred to concurrently as FIG. 11, are views of an exemplary strip-side holder in accordance with the teachings of the present invention. In particular, FIG. 11A is a perspective view, FIG. 11B is a top view, FIG. 11C is a side view, and FIG. 11D is a front view.

Again, the first strip-side holder 1606 and the second strip-side holder 1706 may be the same or slightly different, but for the purposes of illustration FIG. 11 shows a single strip-side holder that may be used in either the first connector assembly 1600 or the second connector assembly 1700. The first and second strip-side holder 1606 and 1706 may have a hole 11002 which may be threaded for example to receive a screw. As previously described, the screw may further insert into the first and second strip receivers 1602 and 1702 at holes 1810 and 1910, thereby attaching the first and second connector assemblies 1600 and 1700 to the LED strip 1300.n as can be seen in FIGS. 6 and 7.

FIG. 12A, FIG. 12B and FIG. 12C, herein referred to concurrently as FIG. 12, are views of an exemplary piercing PCB-contact point in accordance with the teachings of the present invention. In particular, FIG. 12A shows a perspective view, FIG. 12B shows a side view, and FIG. 12C shows a front or back view. The piercing contact points 1802 and 1902 may be the same or slightly different, but for the purposes of illustration FIG. 12 shows a single piercing contact point that may be used in either the first connector assembly 1600 or the second connector assembly 1700. As previously described with reference to the first and second strip receivers 1602 and 1702 described in FIGS. 8 and 9, the piercing PCB-contact points 1802 and 1902 may pierce through the installation of the respective first cable 1020 or second cable 1030 and establish a contact or connection with the otherwise insulated wire therewithin. The piercing contact points 1802 and 1902 may further couple with the PCB contacts 1806 and 1906, thus providing a path for the power and/or data to be received at the LED strip 1300.n.

FIG. 13A, FIG. 13B and FIG. 13C, herein referred to concurrently as FIG. 13, are views of an exemplary PCB-side seal in accordance with the teachings of the present invention. In particular, FIG. 13A shows a perspective view, FIG. 13B shows a top view, and FIG. 13C shows a cross-section view taken along the lines shown in FIG. 13B. The PCB-side seals 1608 and 1708 may be the same or slightly different, but for the purposes of illustration FIG. 13 shows a single PCB-side seal that may be used in either the first connector assembly 1600 or the second connector assembly 1700. The PCB-side seal 1608 and 1708 may be made of a rubber material, and may allow for weather tight installation of the first and second connector assemblies 1600 and 1700.

FIGS. 15 thru 23 and FIGS. 25 thru 27, referred to concurrently below, provide an exemplary cable tensioning system and frame connector assembly.

Figure 15:
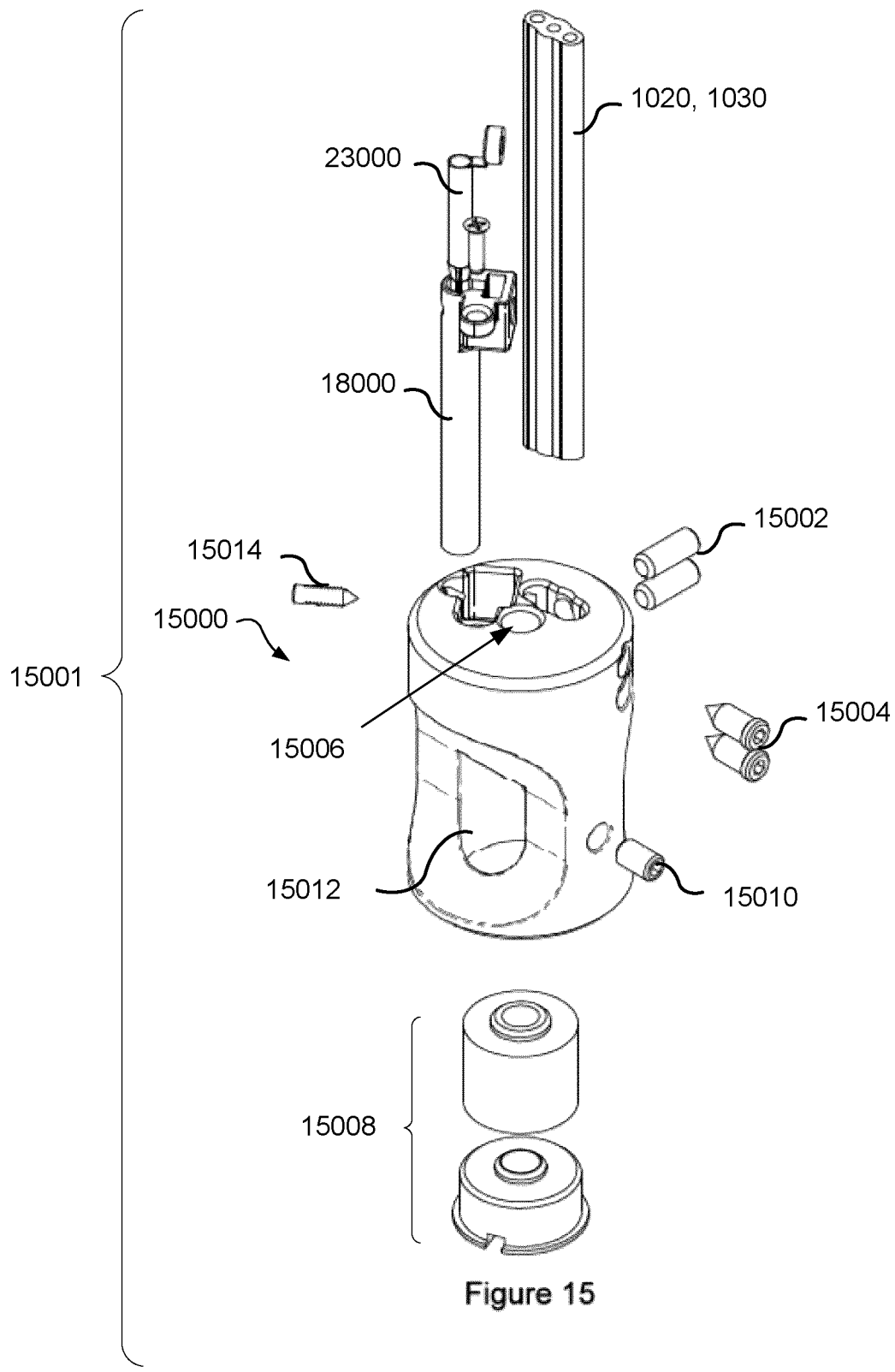
FIG. 15 is an exploded perspective view of an exemplary cable tensioner assembly in accordance with the teachings of the present invention.
Figure 16B:
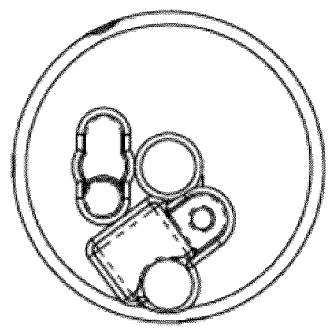
Figure 16D:
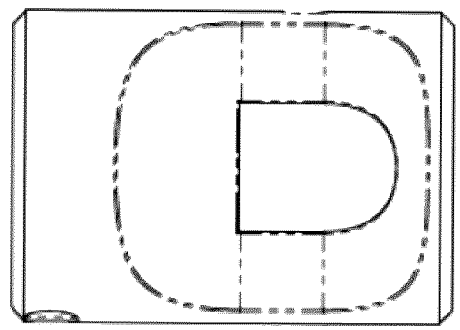
Figure 16A:
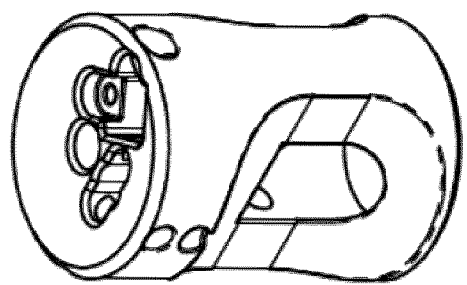
Figure 16C:
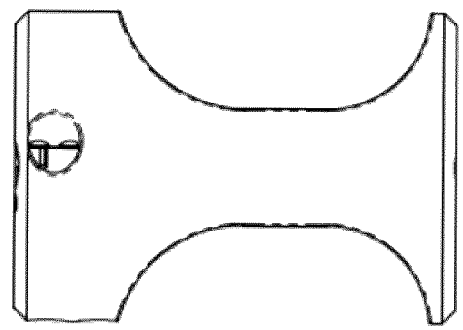
Figure 16I:
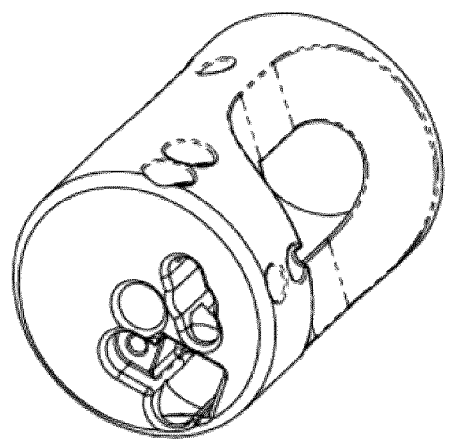
Figure 16H:
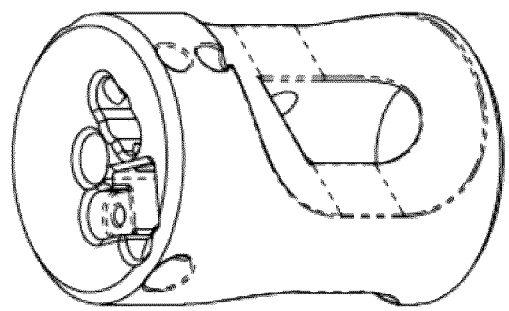
Figure 16G:
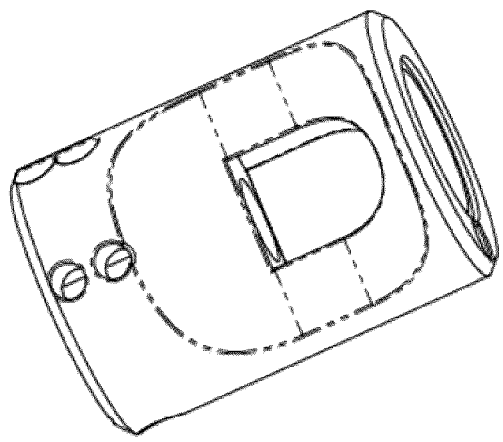
Figure 18D:
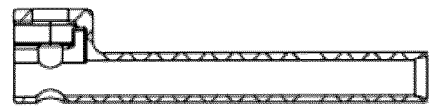
FIG. 18A, FIG. 18B, FIG. 18C and FIG. 18D, herein referred to concurrently as FIG. 18, are views of an exemplary body insulator in accordance with the teachings of the present invention.
Figure 18B:
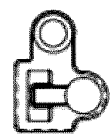
Figure 18C:
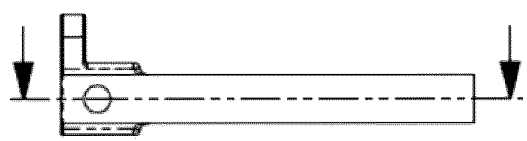
Figure 18A:
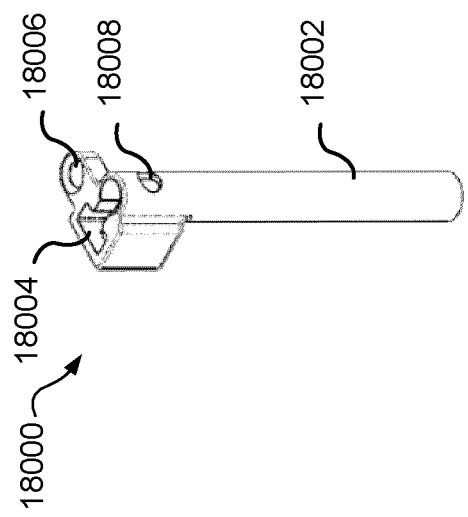
Figure 19D:
FIG. 19A, FIG. 19B, FIG. 19C and FIG. 19D, herein referred to concurrently as FIG. 19, are views of an exemplary mirrored body insulator in accordance with the teachings of the present invention.
Figure 19B:
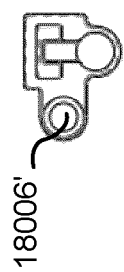
Figure 19C:
Figure 19A:

FIG. 15 is an exploded perspective view of an exemplary cable tensioner 15001 assembly in accordance with the teachings of the present invention. The cable tensioner assembly 15001 coupled to the first cable 1020 and the second cable 1030 may provide for adjusting tension in the cables while insuring continued insulation of the at least three conductive wires. As shown in FIG. 26, the cable tensioner assembly 15001 comprises a cable tensioner body 15000 that is configured to receive a cable, for example the first or second cable 1020 or 1030. A set of flat screws 15002 that may have a flat face on one side and an interface for receiving a tool such as an Allen key on the other side is used to maintain tension against the cable tensioner body 15000 and the cable 1020 or 1030. The flat face of the flat screws 15002 ensures that the cable insulation is not punctured. A set of piercing screws 15004 that have a sharp point on one side and an interface for receiving a tool such as an Allen key on the other side is used to pierce the insulation of the cable 1020 or 1030 and connect the right-most wire of the cable (in the configuration of FIG. 15) to the cable tensioner body 15000. In some embodiments an inner tensioning wire of cable 1020 or 1030 may simply be a ground wire, and therefore the piercing screws 15004 may not be necessary and/or the flat screws 15002 may also be piercing.

Figure 27A:
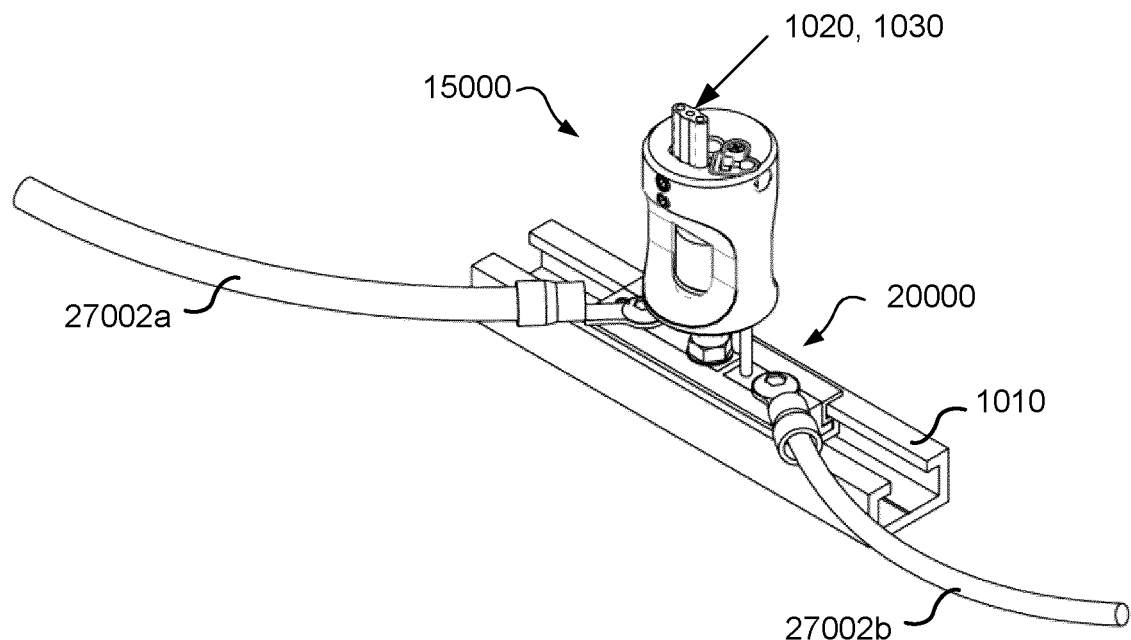
FIG. 27A and FIG. 27B, herein referred to concurrently as FIG. 27, are views of an exemplary cable tensioner assembly with an exemplary frame connector assembly in accordance with the teachings of the present invention.
Figure 27B:
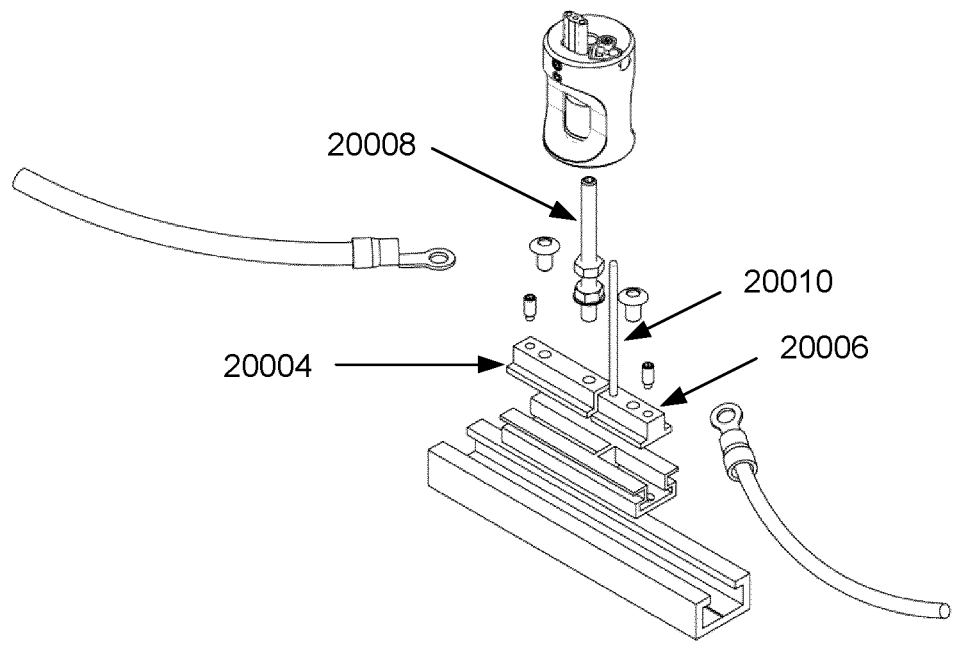

The cable tensioner assembly 15001 couples with a frame connector assembly and/or anchor assembly, for example the frame connector assembly 20000 shown in FIG. 20. FIG. 20A and FIG. 20B, herein referred to concurrently as FIG. 20, are perspective views of an exemplary frame connector assembly in accordance with the teachings of the present invention. FIG. 27A and FIG. 27B, herein referred to concurrently as FIG. 27, are views of an exemplary cable tensioner assembly with an exemplary frame connector assembly in accordance with the teachings of the present invention. In particular, FIG. 27A shows an assembled view of the cable tensioner assembly with frame connector assembly, and FIG. 27B shows an exploded view of the cable tensioner assembly with frame connector assembly.

Referring to FIG. 20A, the frame connector assembly 20000 comprises a frame insulator 20002 and two wire connectors 20004 and 20006 made of conductive material. As seen in the assembled view shown in FIG. 20B, the two wire connectors 20004 and 20006 slide into the frame insulator 20002 and are maintained into place therein using a slug 20005 (e.g., made of non-conductive material) aligned with a matching depression in the frame insulator 20002. The wire connectors 20004 and 20006 also each provide a jumper screw 20007 usable to connect corresponding wires from the display controller and/or power supply while maintaining proper inter isolation therebetween. The wire connector 20004 further receives bolt 20008, which provide the isolation-proof connection to the wires in the first and second cables, as will be described below. The frame connector 20006 is similar but receives the pin 20010 therein instead of the bolt 20008. As shown in FIG. 27, the frame connector assembly 20000 slides into the frame 1010, which may for example have a corresponding U-shaped channel to receive the structure of the frame connector assembly 20000.

Figure 21D:
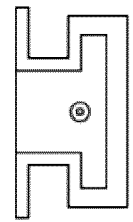
FIG. 21A, FIG. 21B, FIG. 21C and FIG. 21D, herein referred to concurrently as FIG. 21, are views of an exemplary frame insulator in accordance with the teachings of the present invention.
Figure 21B:
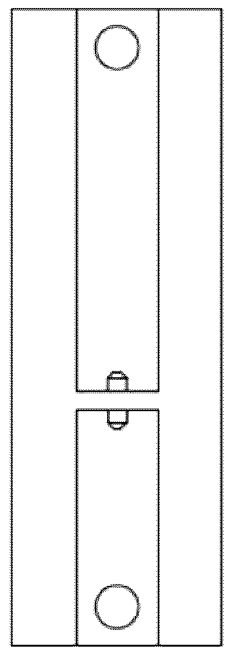
Figure 21C:
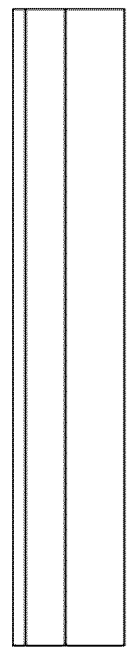
Figure 21A:
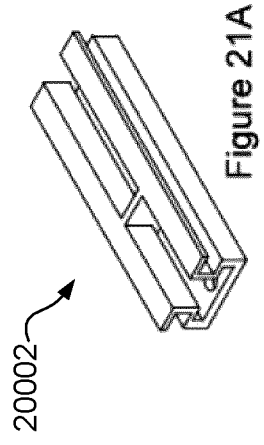

FIG. 21A, FIG. 21B, FIG. 21C and FIG. 21D, herein referred to concurrently as FIG. 21, are views of an exemplary frame insulator 20002 in accordance with the teachings of the present invention. In particular, FIG. 21A shows a perspective view, FIG. 21B shows a top view, FIG. 21C shows a front view, and FIG. 21D shows a side view.

Figure 22E:
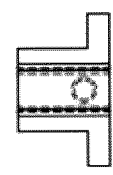
FIG. 22A, FIG. 22B, FIG. 22C, FIG. 22D and FIG. 22E, herein referred to concurrently as FIG. 22, are views of an exemplary frame connector in accordance with the teachings of the present invention.
Figure 22B:
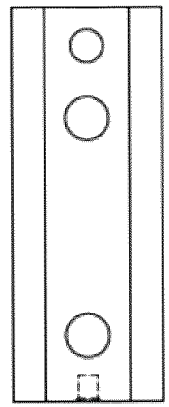
Figure 22D:
Figure 22A:
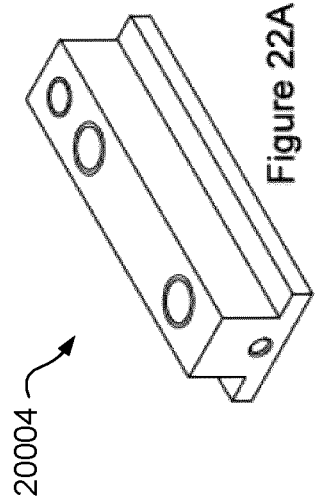
Figure 22C:

FIG. 22A, FIG. 22B, FIG. 22C, FIG. 22D and FIG. 22E, herein referred to concurrently as FIG. 22, are views of an exemplary frame connector, for example first wire connector 20004, in accordance with the teachings of the present invention. In particular, FIG. 22A shows a perspective view, FIG. 22B shows a top view, FIG. 22C and FIG. 22E show side views, and FIG. 22D shows a front view.

Referring back to FIG. 15, the cable tensioner body 15000 further comprises a hole 15006 that runs longitudinally therethrough. The cable tensioner assembly 15001 also comprises a tension adjuster assembly 15008, including a rotatable-knob and a base ring, that is inserted into the cable tensioner body 15000 and has a central hole that is aligned with the hole 15006 in the cable tensioner body 15000. Through the hole 15006 in the cable tensioner body 15000 and aligned with the hole in the rotatable adjuster assembly

15008, the larger bolt 20008 of the frame connector assembly 20000 is received as seen in FIG. 27. Though not shown in the Figures, the bolt 20008 and the base ring of the tension adjuster assembly 15008 may be threaded. In an exemplary embodiment, the base ring of the tension adjuster assembly 15008 is sandwiched between the rotatable-knob and a bottom stopper 20009 of the bolt 20008. The rotatable-knob is secured within the body 15000 by the threaded bolt 20008 and by the base ring.

A locking cylinder 15010 having a flat face on one side and an interface for receiving a tool such as an Allen key on the other side is used to prevent unwanted rotation of the rotatable-knob of the tension adjuster assembly 15008 that may be caused, for example by vibrations or movement. Through a recess 15012 in the cable tensioner body 15000, which may exist in two places of the cable tensioner body 15000 on opposite sides, a user may reach with fingers or a tool to rotate the rotatable-knob from the tension adjuster 15008, thereby causing the cable tensioner body 15000 to move longitudinally (e.g., up or down) along the bolt 20008. Because the cable tensioner body 15000 is solidarized with the cable 1020 or 1030 (i.e., through 15002), tension can controllably be adjusted therethrough.

As previously described, the piercing screws 15004 connect the right-most wire in the cable 1020 or 1030, for example a ground or reference voltage wire, to the cable tensioner body 15000. Referring back to FIG. 20, the bolt 20008 of the frame connector assembly 20000 is coupled to the cable tensioner body 15000, and is also coupled with a first wire connector 20004. Therefore, through an external wire 27002a shown in FIG. 27, the wire connector 20004 may provide a reference voltage or ground wire to be coupled with the right-most wire in the cable 1020 or 1030. Due to the configuration of the frame connector assembly 20000 comprising the frame insulator 20002 in the center, the reference voltage wire is completely insulated from a wire that may be provided in the second wire connector 20006, as will be discussed next.

The cable tensioner body 15000 is further configured to receive a body insulator 18000, as shown for example in FIG. 18. FIG. 18A, FIG. 18B, FIG. 18C and FIG. 18D, herein referred to concurrently as FIG. 18, are views of an exemplary body insulator in accordance with the teachings of the present invention. In particular, FIG. 18A shows a perspective view, FIG. 18B shows a top view, FIG. 18C shows a front view, and FIG. 18D shows a cross-sectional view along the lines indicated in FIG. 18C.

The body insulator 18000 comprises a hollow cylindrical body 18002 with a protruding structure at a first end thereof comprising a slot 18004 and a hole 18006 for receiving a screw for maintaining the body insulator 18000 on the cable tensioner body 15000. The body insulator 18000 further comprises another hole 18008 at the first end of the cylindrical body 18002 that is diametrically opposite from the slot 18004. Referring to FIG. 15, the body insulator 18000 slides into the cable tensioner body 15000 and may be secured by tightening a screw into the hole 18006. The body insulator 18000 in turn receives a slug connector 23000, as shown for example in FIG. 23.

FIG. 23A, FIG. 23B and FIG. 23C, herein referred to concurrently as FIG. 23, are views of an exemplary slug connector in accordance with the teachings of the present invention. In particular, FIG. 23A shows a perspective view, FIG. 23B shows a top view, and FIG. 23C shows a side view. The slug connector 23000 comprises a hollow cylindrical body 23002 of a diameter less than the diameter of the cylindrical body 18002 of the body insulator 18000. At a first end of the slug connector 23000 is a vertical ring 23004 configured to receive a screw. Referring back to FIG. 15, the slug connector 23000 may slide into the body insulator 18000, and the vertical ring 23004 of the slug connector 23000 is received in the slot 18004 of the body insulator 18000. The slug connector 23000 and body insulator 18000 are positioned in the cable tensioner body 15000 adjacent to the left-most wire in the cable 1020 or 1030. A piercing screw 15014 that has a sharp point on one side and an interface for receiving a tool such as an Allen key on the other side is inserted through the hole 18008 in the body insulator 18000, through the vertical ring 23004 of the slug connector 23000, and pierces the insulation of cable 1020 or 1030 to establish a connection with the left-most wire. The body insulator 18000 ensures that the slug connector 23000 connected with the left-most wire of cable 1020 or 1030 is isolated from the cable tensioner body 15000 which is connected with the right-most wire of cable 1020 or 1030.

As previously described, the cable tensioner body 15000 is connected with the frame connector assembly 20000 as shown in FIG. 27. In particular, the cable tensioner body 15000 and the frame connector assembly 20000 are configured so that the pin 20010 of the frame connector assembly 20000 is received in the slug connector 23000 that is enclosed by the body insulator 18000 within the cable tensioner body 15000. Referring again to FIG. 23A, along the cylindrical body 23002 of the slug connector 23000 is a crimped portion 23006, which is controllably collapsed to be slightly smaller in diameter than the pin 20010 of the frame connector assembly 20000. Various procedures may be used for forming the crimped portion 23006. When the pin 20010 of the frame connector assembly 20000 is brought into contact with the slug connector 23000, the pin 20010 (of slightly larger diameter than the crimped portion 23006) forces the crimped portion 23006 to expand just enough for the pin 20010 to pass through. Therefore, a connection is maintained by friction between the crimped portion 23006 of the slug connector 23000 when the cable tensioner body 15000 moves longitudinally along the bolt 20008. The slug connector 23000, in turn, is connected with the left-most wire of the cable 1020 or 1030 and the pin 20010 of the frame connector assembly 20000 (which in turn is connected with the second wire connector 20006). Therefore, the second wire connector 20006 may be coupled with the left-most wire of the cable 1020 or 1030, for example this may be the data wire or positive voltage wire, and the data or positive voltage may be provided by the external wire 27002b. Again, due to the configuration of the frame connector assembly 20000 comprising the frame insulator 20002 in the center, the data or positive voltage wire would be completely insulated from a reference voltage wire for example that may be provided in the first wire connector 20004.

FIG. 16A, FIG. 16B, FIG. 16C, FIG. 16D, FIG. 16D, FIG. 16E, FIG. 16F, FIG. 16G, FIG. 16H and FIG. 16I, herein referred to concurrently as FIG. 16, are views of an exemplary cable tensioner body in accordance with the teachings of the present invention.

FIG. 17A, FIG. 17B, FIG. 17C, FIG. 17D and FIG. 17E, herein referred to concurrently as FIG. 17, are views of an exemplary mirrored cable tensioner body 15000' in accordance with the teachings of the present invention. In particular, the mirrored cable tensioner body 15000' may have the same configuration as the cable tensioner body 15000 shown in FIG. 15 and FIG. 16, however it may have the opposite orientation as may be apparent when comparing the respective top views shown in FIG. 16B and FIG. 17B. The different mirrored components allow to select which of the right-most or left-most cable is isolated from the tensioner body 15000/15000'. For instance, the use of the cable tensioner body 15000 and mirrored cable tensioner body 15000' may be at least in part based on which part of the frame that the cable tensioner assembly is being attached to. For example, the cable tensioner body 15000 may be attached to a first end of the cable at a bottom of the frame, and the cable tensioner body 15000' may be attached to a second end of the cable at a top of the frame.

FIG. 19A, FIG. 19B, FIG. 19C and FIG. 19D, herein referred to concurrently as FIG. 19, are views of an exemplary mirrored body insulator 18000' in accordance with the teachings of the present invention. Similar to the mirrored cable tensioner body 15000' described with reference to FIG. 17, the mirrored body insulator 18000' may have the same configuration as the body insulator 18000 shown in FIG. 18, however it may have the opposite orientation in that the hole 18006 of the body insulator 18000 for receiving a screw is now on the left side of the mirrored body insulator 18000 and is labeled hole 18006' as may be apparent when comparing the respective top views shown in FIGS. 18B and 19B.

Figure 28:
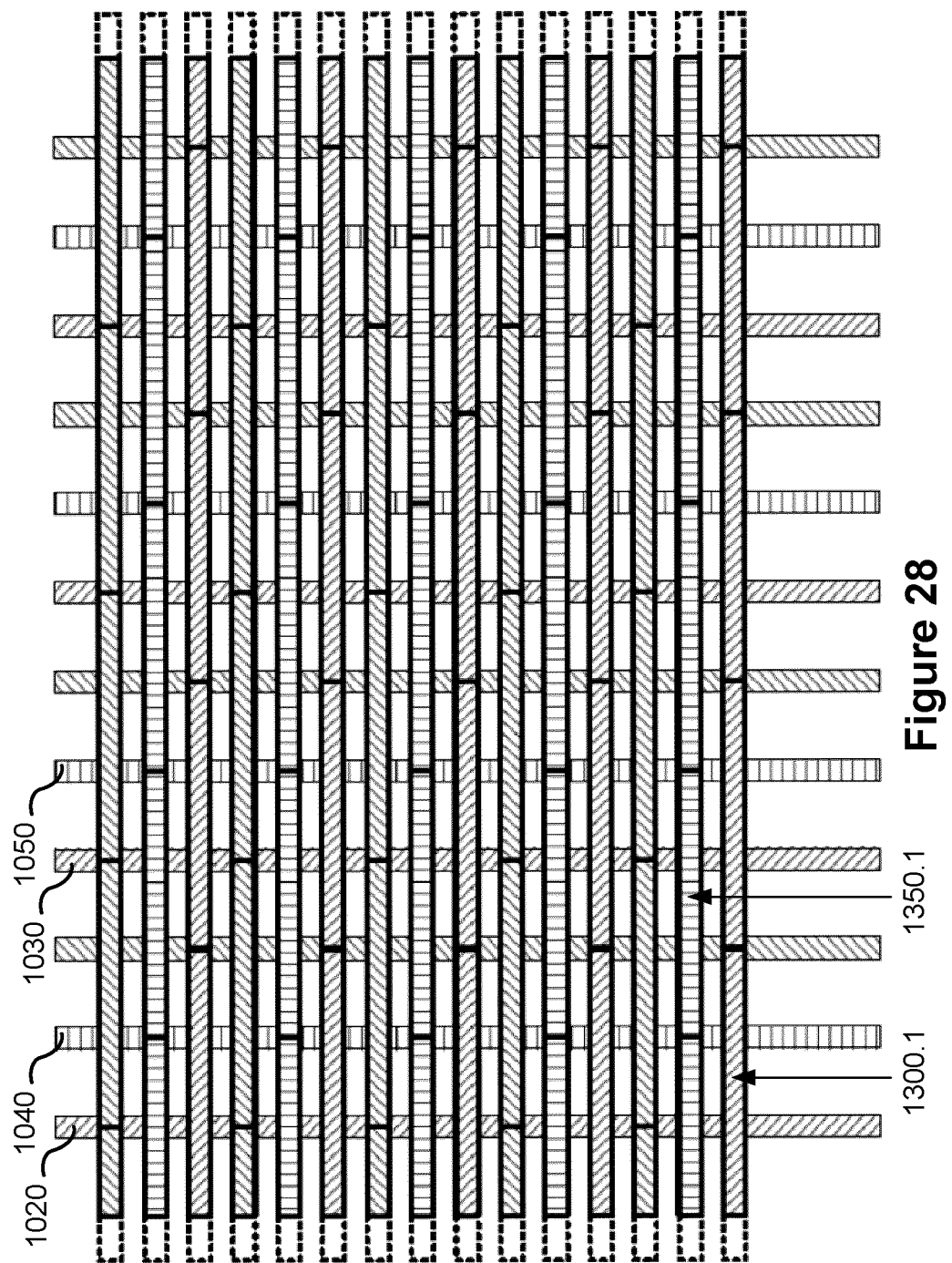
FIG. 28 is a logical representation of an exemplary vertical intertwined installation in accordance with the teachings of the present invention.

FIG. 28 is a logical representation of an exemplary vertical intertwined installation in accordance with the teachings of the present invention. It may be possible to improve longitudinal alignment between the first plurality of strips 1300 and the second plurality of strips 1350 by having one of the first cable 1020 or the second cable 1030 attached to a first plurality of strips 1300 positioned between the third cable 1040 and the fourth cable 1050 attached to the second plurality of strips 1350. At least some of the second plurality of strips (e.g., 1350.1) may mechanically attach to the one cable (e.g., second cable 1030) laid between the third cable 1040 and the fourth cable 1050 and at least some of the first plurality of strips (e.g., 1300.1) may mechanically attach to one of the third cable and the fourth (e.g., third cable 1040) positioned between the first cable 1020 and the second cable 1030 (e.g., in an intertwined configuration).

The hatching of the strips and cables used in FIG. 28 indicates which strips are maintained between which cables based, where the strips are maintained between cables when the hatching of strips and the cables are perpendicular to each other. The dark line on the strips indicate where a LED strip terminates. The intertwined installation may make it less likely for misalignment of LED modules to occur. For example, if an intermediate cable loses tension or is over-tensioned, the plurality of mechanical connections along the LED strip(s) that were attached to that cable would resist movement and therefore suppress or limit misalignment of the LED modules.

Figure 29:
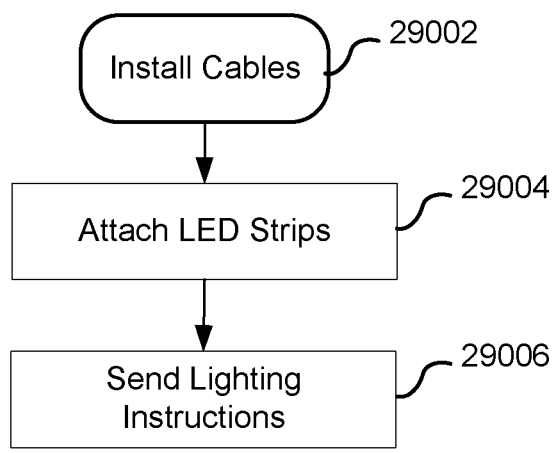
FIG. 29 is a method for displaying defined patterns on a temporary or permanent display system.

FIG. 29 is a method 29000 for displaying defined patterns on a temporary or permanent display system. The method comprises installing a set of cables (29002), comprising at least a first cable and a second cable, which provide three or more three conductive wires insulated from one another comprising at least one reference voltage wire, a positive voltage wire and a data wire. The method 29000 also comprises detachably attaching a plurality of strips between the first cable and the second cable along a defined longitudinal distribution (29004). The reference voltage, the positive voltage and the data are received by the plurality of strips, each of the plurality of strips comprising a subset of the individually controllable LEDs positioned therealong in a defined transverse distribution. The method 26000 also comprises sending lighting instructions for the plurality of individually controllable LEDs over the data wire (29006), the lighting instructions being set considering the defined longitudinal distribution of the plurality of strips and the defined transverse distribution along each of the plurality of strips in order to provide the defined patterns.

Optionally, the method 29000 may further comprise, prior to sending lighting instructions, sending configuration instructions to the plurality of strips over the data wire for assigning a unique identifier to each of the plurality of individually controllable LEDs. The method 29000 may also, alternatively or in addition, further comprise, prior to sending lighting instructions, mapping each of the plurality of individually controllable LEDs to defined coordinates in the display system considering the defined transverse distribution and the defined longitudinal distribution. In such an embodiment, the method 29000 may also further comprise, prior to sending lighting instructions, encoding a video stream into the lighting instructions considering the defined coordinates.

Figure 30:
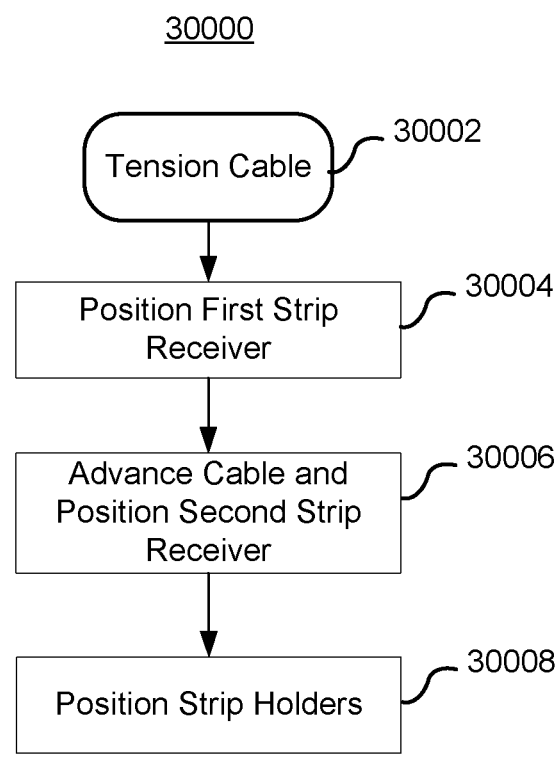
FIG. 30 is a method for fabricating a cable for use in a temporary or permanent display system.

FIG. 30 is a method 30000 for fabricating a cable (for example, first cable 1020 or second cable 1030) for use in a temporary or permanent display system. The method 30000 comprises providing a cable, comprising two or more conductive wires insulated from one another, under controlled tension in an assembly machine (30002). The method 30000 follows by, in the assembly machine, providing a first strip receiver component and a second strip receiver component (for example the strip receivers) each comprising at least two through-contact brackets or piercing contact points and isolated from one another each comprising a piercing end through a first surface of the strip receiver component and a PCB-compatible electrical contact point and through a second surface opposite from the first surface of the strip receiver. While the cable is under controlled tension in the assembly machine, the method 27000 continues with fixably positioning the first strip receiver component of a first connector at a first location on the cable (30004), wherein the through-contact brackets of the first strip receiver provide electric connection towards corresponding ones of the two or more conductive wires. Still in the assembly machine, the method 30000 comprises advancing the cable under controlled tension by a specific distance and fixably positioning the second strip receiver component of a second connector at a second location on the cable (30006). The through-contact brackets of the second strip receiver provide electric connection towards corresponding ones of the two or more conductive wires and the specific distance defines longitudinal distribution of the LED modules for the display system. The method 30000 also comprises positioning a first strip holder over the first strip receiver of the first connector and a second strip holder over the second strip receiver of the second connector (30008). The first strip holder and the first strip receiver cooperate for ensuring continued electrical connection of the PCB-compatible electrical contact point of the first strip receiver with a first one of the plurality of strips and the second strip holder and the second strip receiver cooperate for ensuring continued electrical connection of the PCB-compatible electrical contact point of the second strip receiver with a second one of the plurality of strips.

In some embodiments, the first strip receiver component and the second strip receiver component are of a first model compatible with a first positioning structure of the strips and the method 30000 further comprises providing a second cable, comprising two or more conductive wires insulated from one another, under the controlled tension in the assembly machine. The method 30000 then comprises, in the assembly machine, providing a third strip receiver component and a fourth strip receiver component each of a second model compatible with a second positioning structure of the strips. Still in the assembly machine and while the second cable is under controlled tension, the method 30000 continues with fixably positioning the third strip receiver component of a third connector at a first location on the second cable. The through-contact brackets of the third strip receiver provide electric connection towards corresponding ones of the two or more conductive wires. After advancing the second cable under controlled tension by the specific distance in the assembly machine, the method 30000 comprises fixably positioning the fourth strip receiver component of a fourth connector at a second location on the second cable before positioning a third strip holder over the third strip receiver of the third connector and a fourth strip holder over the fourth strip receiver of the fourth connector. The third strip holder and the third strip receiver cooperate for ensuring continued electrical connection of the PCB-compatible electrical contact point of the third strip receiver with the first one of the plurality of strips and the fourth strip holder and the fourth strip receiver cooperate for ensuring continued electrical connection of the PCB-compatible electrical contact point of the fourth strip receiver with the second one of the plurality of strips. The two or more conductive wires of the cable and the two or more conductive wires of the second cable provide, in the display system, a reference voltage, a positive voltage and a data feed.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses. In the drawings, identical reference numerals may be used to identify identical or similar components throughout the different views. The drawings are not necessarily drawn to scale.

What is claimed is:

1. A display system comprising:
    a plurality of individually controllable light emitting diode modules (LEDs) for displaying defined patterns;
    a set of cables, comprising at least a first cable and a second cable, providing three or more three conductive wires insulated from one another comprising at least one reference voltage wire, a positive voltage wire and a data wire;
    a plurality of strips maintained between the first cable and the second cable along a defined longitudinal distribution and receiving the reference voltage, the positive voltage and the data therefrom, each of the plurality of strips comprising a subset of the individually controllable LEDs positioned therealong in a defined transverse distribution; and
    a display controller module comprising at least one processor that sends lighting instructions for the plurality of individually controllable LEDs over the data wire, the lighting instructions being set considering the defined longitudinal distribution of the plurality of strips and the defined transverse distribution along each of the plurality of strips in order to provide the defined patterns.

2. The display system of claim 1 further comprising an enclosure, wherein the first cable extends between a first pair of installation locations along the enclosure and the second cable extends between a second pair of installation locations along the enclosure.

3. The display system of claim 1, wherein each of the plurality of strips comprises a local processor for processing a subset of the lighting instructions related to the corresponding subset of individually controllable LEDs.

4. The display system of claim 1 further comprising a cable tensioner system coupled to the first cable and the second cable for adjusting tension in the first cable and tension in the second cable while insuring continued insulation of the at least three conductive wires.

5. The display system of claim 1, wherein the set of cables comprises two reference voltages wires with the first cable comprising a first of the two reference voltage wires and the positive voltage wire and the second cable comprising a second of the two reference voltage wires and the data wire.

6. The display system of claim 1, each of the plurality of strips being a Printed Circuit Board (PCB), the display system further comprising:
    a plurality of first connectors, permanently maintained on the first cable in accordance with the defined longitudinal distribution, detachably attaching one of the PCBs for providing the reference voltage and the positive voltage from the first cable thereto; and
    a plurality of second connectors, permanently maintained on the second cable in accordance with the defined longitudinal distribution, detachably attaching the one of the PCBs for providing the data and the reference voltage from the second cable thereto.

7. The display system of claim 6, wherein every one of the first connectors is specifically shaped for a corresponding first structure of the PCB and every one of the second connectors is specifically shaped for a corresponding second structure of the PCB different from the first structure for ensuring expected connectivity between the PCB and the set of cables.

8. The display system of claim 6, wherein the data wire is cut in every one of the second connectors such that the lighting instructions transit through the PCB, causing the plurality of strips to be logically daisy-chained.

9. The display system of claim 1, wherein:
    the set of cables comprises at least a third cable and a fourth cable parallel to the first cable and the second cable providing at least three additional conductive wires insulated from one another comprising a second reference voltage wire, a second positive voltage wire and a second data wire,
    the display system further comprising a second plurality of strips maintained between the third and the fourth cable along a second defined longitudinal distribution matching the defined longitudinal distribution and receiving the reference voltage from the second reference voltage wire, the positive voltage from the second positive voltage wire and the data from the second data wire, each of the second plurality of strips comprising an additional subset of the individually controllable LEDs positioned therealong in a second defined transverse distribution matching the defined transverse distribution.

10. The display system of claim 9, wherein, in order to improve longitudinal alignment between the first plurality of strips and the second plurality of strips:
    one of the first cable or the second cable is positioned between the third cable and the fourth cable;

at least some of the second plurality of strips mechanically attach to the one cable laid between the third cable and the fourth cable; and at least some of the plurality of strips mechanically attach to one of the third cable and the fourth positioned between the first cable and the second cable.

11. The display system of claim 9, further comprising a transverse alignment mechanism for longitudinally aligning one or more lateral ends from individual ones of the plurality of strips to corresponding opposite ends from corresponding ones of the second plurality of strips.

12. The display system of claim 11, wherein the transverse alignment mechanism comprises oppositely polarized magnets on the one or more lateral ends and the corresponding opposite ends.

13. The display system of claim 12, wherein the polarized magnets are enclosed in respective mating enclosures respectively attached to the one or more lateral ends and the corresponding opposite ends.

14. The display system of claim 1, wherein the defined longitudinal distribution establishes a longitudinal pitch of 10 mm to 200 mm between longitudinally aligned LEDs from different ones of the plurality of strips.

15. The display system of claim 14, wherein the longitudinal pitch is constant throughout the defined longitudinal distribution.

16. The display system of claim 1, wherein the defined transverse distribution establishes a transverse pitch of 10 mm to 200 mm between LEDs in the subset of LEDs.

17. The display system of claim 16, wherein the transverse pitch is constant throughout the defined transverse distribution.

18. The display system of claim 13, wherein the defined transverse distribution establishes a transverse pitch of 10 mm to 200 mm between LEDs in the subset of LEDs, wherein the longitudinal pitch and vertial pitch are equal.

19. The display system of claim 1, wherein each of the plurality of individually controllable LEDs is a surface-mount device light-emitting diode module comprising one to four individual light-emitting diodes.

20. A method for displaying defined patterns on a temporary or permanent display system comprising a plurality of individually controllable light emitting diode modules (LEDs) comprising:

installing a set of cables, comprising at least a first cable and a second cable, providing three or more three conductive wires insulated from one another comprising at least one reference voltage wire, a positive voltage wire and a data wire;

detachably attaching a plurality of strips between the first cable and the second cable along a defined longitudinal distribution, the reference voltage, the positive voltage and the data being received therefrom by the plurality of strips, each of the plurality of strips comprising a subset of the individually controllable LEDs positioned therealong in a defined transverse distribution; and sending lighting instructions for the plurality of individually controllable LEDs over the data wire, the lighting instructions being set considering the defined longitudinal distribution of the plurality of strips and the defined transverse distribution along each of the plurality of strips in order to provide the defined patterns.

21. The method of claim 20, further comprising:
prior to sending lighting instructions, sending configuration instructions to the plurality of strips over the data wire for assigning a unique identifier to each of the plurality of individually controllable LEDs.

22. The method of claim 20, further comprising:
prior to sending lighting instructions, mapping each of the plurality of individually controllable LEDs to defined coordinates in the display system considering the defined transverse distribution and the defined longitudinal distribution.

23. The method of claim 22, further comprising:
prior to sending lighting instructions, encoding a video stream into the lighting instructions considering the defined coordinates.

24. A method of fabricating a cable for use in a temporary or permanent display system comprising a plurality of individually controllable light emitting diode modules (LEDs) positioned on a plurality of strips, the method comprising:

providing a cable, comprising two or more conductive wires insulated from one another, under controlled tension in an assembly machine;

in the assembly machine, providing a first strip receiver component and a second strip receiver component each comprising at least two through-contact brackets isolated from one another each comprising a piercing end through a first surface of the strip receiver component and a PCB-compatible electrical contact point through a second surface opposite from the first surface of the strip receiver;

in the assembly machine, while the cable is under controlled tension, fixably positioning the first strip receiver component of a first connector at a first location on the cable, wherein the through-contact brackets of the first strip receiver provide electric connection towards corresponding ones of the two or more conductive wires;

in the assembly machine, after advancing the cable under controlled tension by a specific distance, fixably positioning the second strip receiver component of a second connector at a second location on the cable, wherein the through-contact brackets of the second strip receiver provide electric connection towards corresponding ones of the two or more conductive wires, the specific distance defining longitudinal distribution of the LEDs for the display system; and positioning a first strip holder over the first strip receiver of the first connector and a second strip holder over the second strip receiver of the second connector, wherein the first strip holder and the first strip receiver cooperate for ensuring continued electrical connection of the PCB-compatible electrical contact point of the first strip receiver with a first one of the plurality of strips and the second strip holder and the second strip receiver cooperate for ensuring continued electrical connection of the PCB- compatible electrical contact point of the second strip receiver with a second one of the plurality of strips.

25. The method of claim 24, wherein the first strip receiver component and the second strip receiver component are of a first model compatible with a first positioning structure of the strips, the method further comprising:

providing a second cable, comprising two or more conductive wires insulated from one another, under the controlled tension in the assembly machine;

in the assembly machine, providing a third strip receiver component and a fourth strip receiver component each of a second model compatible with a second positioning structure of the strips;

in the assembly machine, while the second cable is under controlled tension, fixably positioning the third strip receiver component of a third connector at a first location on the second cable, wherein the through-contact brackets of the third strip receiver provide electric connection towards corresponding ones of the two or more conductive wires;

in the assembly machine, after advancing the second cable under controlled tension by the specific distance, fixably positioning the fourth strip receiver component of a fourth connector at a second location on the second cable; and positioning a third strip holder over the third strip receiver of the third connector and a fourth strip holder over the fourth strip receiver of the fourth connector, wherein the third strip holder and the third strip receiver cooperate for ensuring continued electrical connection of the PCB-compatible electrical contact point of the third strip receiver with the first one of the plurality of strips and the fourth strip holder and the fourth strip receiver cooperate for ensuring continued electrical connection of the PCB- compatible electrical contact point of the fourth strip receiver with the second one of the plurality of strips, wherein the two or more conductive wires of the cable and the two or more conductive wires of the second cable provide, in the display system, a reference voltage, a positive voltage and a data feed.

\* \* \* \* \*